(12) United States Patent
Blanken

(10) Patent No.: US 7,893,678 B2
(45) Date of Patent: Feb. 22, 2011

(54) CURRENT-MODE CONTROLLED DC-DC CONVERTER

(75) Inventor: Pieter Blanken, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 553 days.

(21) Appl. No.: 11/576,253

(22) PCT Filed: Sep. 21, 2005

(86) PCT No.: PCT/IB2005/053107

§ 371 (c)(1),
(2), (4) Date: Mar. 28, 2007

(87) PCT Pub. No.: WO2006/035369

PCT Pub. Date: Apr. 6, 2006

(65) Prior Publication Data

US 2008/0068866 A1    Mar. 20, 2008

(30) Foreign Application Priority Data

Sep. 28, 2004  (EP) .................................. 04300635
Sep. 16, 2005  (EP) .................................. 05300754

(51) Int. Cl.
*G05F 1/00* (2006.01)
(52) U.S. Cl. ..................................... 323/285
(58) Field of Classification Search .................. 323/285, 323/282, 284, 223, 224, 271, 288, 351
See application file for complete search history.

(56) References Cited

U.S. PATENT DOCUMENTS

| 6,611,131 | B2* | 8/2003 | Edwards ...................... 323/282 |
| 6,894,471 | B2* | 5/2005 | Corva et al. .................. 323/282 |
| 7,042,203 | B2* | 5/2006 | Van Der Horn et al. ...... 323/285 |
| 7,208,921 | B2* | 4/2007 | Walters ....................... 323/222 |
| 2003/0007376 | A1 | 1/2003 | Brkovic |
| 2005/0068017 | A1* | 3/2005 | Lipcsei ........................ 323/282 |
| 2005/0237041 | A1* | 10/2005 | Weng .......................... 323/282 |
| 2006/0284607 | A1* | 12/2006 | Isobe .......................... 323/282 |

* cited by examiner

*Primary Examiner*—Gary L Laxton
*Assistant Examiner*—Nusrat J Quddus

(57) ABSTRACT

A current-mode controlled DC/DC converter receives an input voltage (Vb) and supplies an output voltage (Vo). A controllable switch (S1) is coupled to an inductor (L) to obtain a periodically varying inductor current (IL) through the inductor (L). A current-mode controller (1) compares (10) the output voltage (Vo) with a reference voltage (Ver) to Obtain an error signal (ER), and applies (11) a transfer function on the error signal (ER) to obtain a control signal (CO; CIO). A correction circuit (7) adds to the control signal (CO; ICO) a correction signal (ICR) representative for a difference between an original value of the control signal (CO; ICO) and an average value of the inductor current (IL) to obtain a modified control signal (MCO; IMC). A drive circuit (3, 4) compares (3) a sensed signal (SE) being representative for the inductor current (IL) with the modified control signal (MCO; ICO) to switch off (4) the controllable switch (S1) when a level of the sensed signal (SE) reaches a level of the modified control signal (MCO; ICO).

26 Claims, 12 Drawing Sheets

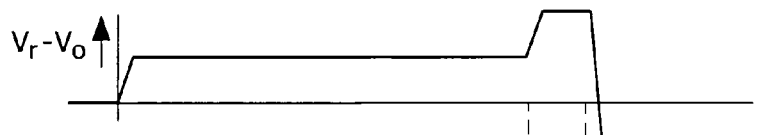
FIG. 8A
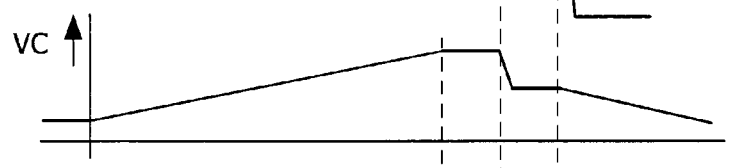
FIG. 8B
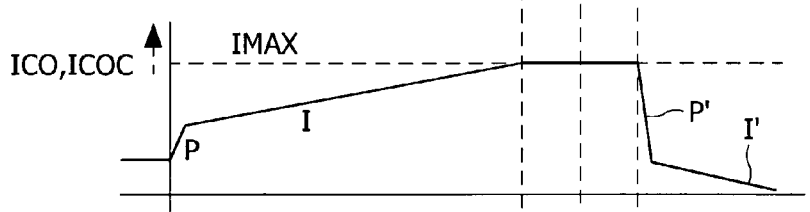
FIG. 8C
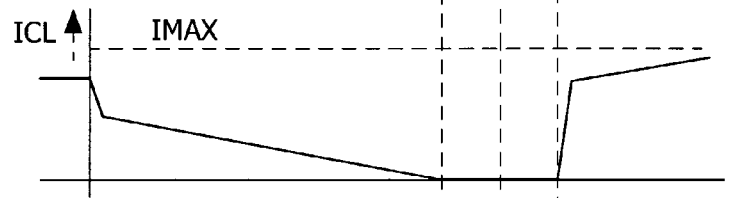
FIG. 8D
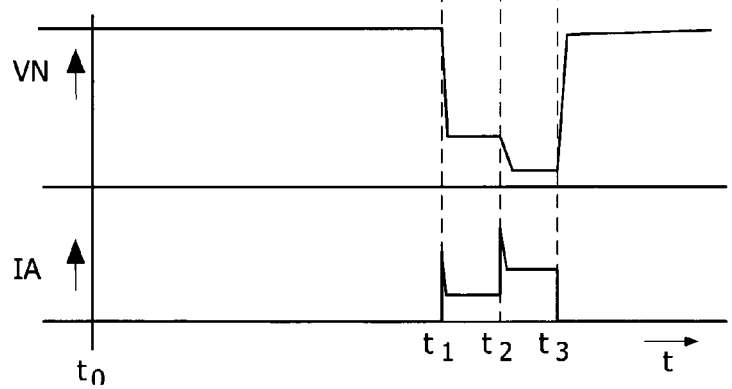
FIG. 8E
FIG. 8F
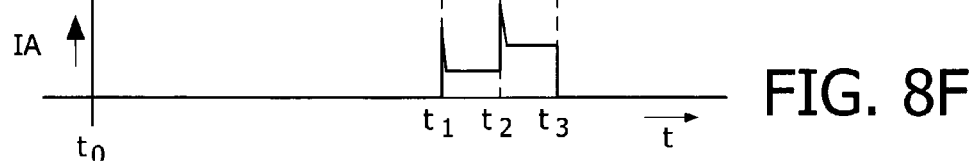

CURRENT-MODE CONTROLLED DC-DC CONVERTER

FIELD OF THE INVENTION

The invention relates to a current-mode controlled DC/DC converter, an apparatus comprising the current-mode controlled DC/DC converter, and method of controlling a current-mode controlled DC/DC converter.

BACKGROUND OF THE INVENTION

In a current-mode controlled DC/DC converter, a controllable switch is coupled to an inductor to generate a periodically changing inductor current through the inductor. An outer voltage regulation loop comprises a current-mode controller which subtracts the output voltage of the converter from a reference voltage to supply an error signal which is processed to obtain a control signal. This control signal may be used as a set level for the peak current in the inductor. The processing usually comprises a PI or a PID controller which receives the error signal and supplies the control signal. An inner current regulation loop switches off the controllable switch when a sense signal which is representative for the inductor current reaches the set level. Thus, the set level, which depends on the difference between the output voltage level and the reference voltage level, determines a peak current level of the current through the inductor. Many options to determine this sense signal are known. For example, the sense signal may be obtained with a current transformer, or as a voltage over an impedance in series with the inductor, this series impedance may be the main current path of the switch.

Usually, the switch is switched on by a clock pulse generated by an oscillator. The on-time of the switch is period of time between the instant the switch is switched on by the clock pulse and the instant the inductor current reaches the set level. The off-time of the switch is the period in time between the instant the inductor current reaches the set level and the next clock pulse. The repetition period is the sum of the on-time and the off-time. In a buck converter, during the on-time, the switch connects the inductor between an input voltage and the output and the inductor current increases. The input voltage may be supplied by a battery. During the off-time, another switch connects the inductor between the output and ground and the inductor current decreases. The topology of other current-mode controlled DC/DC converters, such as for example, boost, buck-boost, Cuk converters, is also well known.

Usually, a slope compensation is required to damp the disturbances in the inductor current. The slope compensation is obtained by varying the set level as a function of time during the repetition period. Often, the current-mode controller either subtracts a sawtooth, a parabola, or piecewise linear slope compensation signal from the control signal to obtain a slope compensated control signal. Now, this slope compensated control signal is used as the set level, and thus, the off-period starts at the instant the peak-current through the inductor reaches the level of the slope compensated control signal.

In some applications, such as for example in telecom systems, the reference voltage is varied to obtain a varying output voltage which fits the actual transmission power required. It is important that the output voltage of the power converter tracks the variations of the reference voltage optimally. It is a drawback of the known current-mode DC/DC converter that its speed of reacting on a variation of the reference voltage is not optimal.

SUMMARY OF THE INVENTION

It is an object of the invention to provide a current-mode controlled DC/DC converter wherein the output voltage reacts faster on a change of the reference voltage.

A first aspect of the invention provides a current-mode controlled DC/DC converter as claimed in claim 1. A second aspect of the invention provides an apparatus comprising a current-mode controlled DC/DC converter as claimed in claim 24. A third aspect of the invention provides a method of controlling a current-mode controlled DC/DC converter as claimed in claim 26. Advantageous embodiments are defined in the dependent claims.

The current-mode controlled DC/DC converter in accordance with the first aspect comprises an inductor and a controllable switch coupled to the inductor to obtain a periodically varying inductor current through the inductor. A current-mode controller compares the output voltage of the converter with a reference voltage to obtain an error signal. Usually, the current-mode controller subtracts the output voltage of the converter from the reference voltage to obtain the error signal. The current-mode controller has a transfer function which is applied on the error signal to obtain a control signal. The transfer function, for example, may be any combination of a P (proportional), I (Integrating), D (differentiating) regulator. Alternatively, the transfer function may be a filter.

The current-mode controlled DC/DC converter further comprises a correction circuit which adds a correction signal to the control signal to obtain a modified control signal. The correction signal is representative for a difference between an original level of the control signal when the correction circuit is not present and an average value of the inductor current. A drive circuit compares a sensed signal which is representative for the inductor current with the modified control signal to switch off the controllable switch when a level of the sensed signal reaches a level of the modified control signal. Now, in contrast to the prior art, the switch is switched off when the level of the sensed signal reaches the level of the modified control signal which is more equal to the average value of the inductor current. Thus, the control signal now more resembles the average value of the inductor current. The original level of the control signal may deviate from the average value of the inductor current due to the fact that the switch is switched off at the peak value of the current sensed, and/or a slope compensation is present.

In the prior art peak-current-mode controlled DC/DC converters, if no slope compensation is present, the control signal is representative for the peak level of the inductor current because the control signal determines the peak level of the inductor current at which the switch is switched off. If slope compensation is present, the slope compensated control signal still is representative for the peak level of the inductor current. Consequently, the control signal is representative for the peak level of the inductor current to which the slope compensation signal is added. This is elucidated in detail with respect to FIG. 2. The open loop gain from the differential input voltage (the output voltage level minus the reference voltage level, or the other way around) to the output voltage depends on the topology of the current-mode controller. Usually, the current-mode controller is a P, a PI or a PID controller. The unity-gain frequency of this open loop gain appears to depend on the transfer from the control signal to the average output current. In the prior art, this transfer is smaller than 1 because the ripple current through the inductor causes the average inductor current to be smaller than the peak current (which is controlled), and, if present, the slope compensation also causes the peak inductor current to be smaller than the control signal. Further, dependent on the DC-DC converter topology, the average current supplied at the output to the load may be smaller (e.g. boost converter) or larger than the average current through the inductor.

In contrast, the current-mode controlled DC/DC converter in accordance with the present invention comprises the correction circuit which receives the control signal and supplies a modified control signal which is used as the set level to be compared with the sensed level. The correction circuit adds a correction signal to the control signal to obtain the modified control signal. Because the modified control signal still determines the peak level of the inductor current, now the control signal must be representative for the peak level of the inductor current minus the correction signal. Thus, if the correction signal is representative for the difference between the peak inductor current and the average inductor current, the control signal is more representative for the average inductor current than for the peak inductor current. Or said in different words, due to the closed loop from differential input voltage to the output voltage, at a same difference between the output voltage and the reference voltage, the modified control signal is independent on the characteristics of the open loop from the differential input voltage to the set level. The output voltage has to reach the same value at a same peak value of the inductor current, and thus the set level (which is now the modified control signal) should be the same. Consequently, the addition of the correction circuit which adds a correction signal representative for the difference between the original control signal when the correction circuit is not present and the average current through the inductor, causes the value of the control signal to drop with this difference. Now, the control signal supplied by the current-mode controller is representative for the average inductor current instead of the peak inductor current and/or the slope compensation current. The transfer function from the control signal to the average output current becomes more equal to unity and the −3 dB bandwidth increases as will be elucidated in detail with respect to FIG. 4.

In an embodiment in accordance with the invention as claimed in claim 2, the correction circuit adds a correction signal representative for a difference between an average value and an extreme value of the inductor current. The control signal now becomes more equal to the average current through the inductor because the difference between the peak current and the average current is compensated for. Or, at least, this difference is decreased.

In an embodiment in accordance with the invention as claimed in claim 3, the current-mode controlled DC/DC converter is a buck converter. The correction circuit generates the correction signal as (Vo*T)/2L, wherein Vo is the output voltage of the DC/DC converter, T is a duration of one period of the periodically varying inductor current, and L is the inductance of the inductor. This correction signal compensates for the difference between the peak current and the average current in the inductor, and for the slope compensation signal swing.

In an embodiment in accordance with the invention as claimed in claim 4, the current-mode controlled DC/DC converter supplies the output voltage and an output current to the load. The correction circuit further comprises a multiplier for multiplying the control signal with a multiplication factor to obtain a multiplied control signal. The multiplication factor is representative for a ratio between the average value of the inductor current and an average value of the output current. Then, the correction circuit adds the correction signal to the multiplied control signal to obtain the modified control signal which is used to set the peak level at which the switch is switched off. Thus, the control signal is first multiplied with the multiplication factor which is defined by the ratio of the average current through the inductor and the average current at the output to obtain a multiplied control signal. Then, the correction signal, which compensates for the difference between the peak current and the average current through the inductor and for the slope compensation signal swing, is added to the multiplied control signal to obtain a modified control signal which is used to set the peak level at which the switch is switched off. Such a multiplier is especially relevant in DC/DC converters wherein the average output current is not equal to the average inductor current, such as buck-boost or boost converters. The multiplier is not required if the average output current is equal to the average inductor current such as in a buck converter.

In an embodiment in accordance with the invention as claimed in claim 5, the current-mode controlled DC/DC converter is a buck-boost converter and the multiplication factor is 1+Vo/Vb, wherein Vb is the input voltage, and Vo is the output voltage.

In an embodiment in accordance with the invention as claimed in claim 6, for the buck-boost converter, the correction circuit generates the correction signal (ln(1+k)−0.5*k/(1+k))*T*Vb/L, wherein ln is the natural logarithm, k=Vo/Vb, Vb is the input voltage, Vo is the output voltage, T is a duration of one period of the periodically varying inductor current, and L an inductance of the inductor.

In an embodiment in accordance with the invention as claimed in claim 7, the current-mode controlled DC/DC converter is a boost converter. The multiplication factor is Vo/Vb, wherein Vb is the input voltage, and Vo is the output voltage.

In an embodiment in accordance with the invention as claimed in claim 8, for the boost converter, the correction circuit generates the correction signal as (Vo−Vb)*T/2L, wherein Vo is the output voltage, Vb is the input voltage, T is a duration of one period of the periodically varying inductor current, and L an inductance of the inductor.

In an embodiment in accordance with the invention as claimed in claim 9, the current-mode controlled DC/DC converter supplies the output voltage and an output current to the load. The correction circuit further comprises a multiplier which multiplies the modified control signal with a multiplication factor being representative for a ratio between the average value of the inductor current and an average value of the output current to obtain a multiplied modified control signal. The drive circuit compares the sensed signal which is representative for the inductor current with the multiplied modified control signal to switch off the controllable switch when a level of the sensed signal reaches a level of the multiplied modified control signal. Thus, now, first the correction signal is added to the control signal to obtain the modified control signal. Then, the modified control signal is multiplied by the multiplication factor to obtain the multiplied modified control signal.

In an embodiment in accordance with the invention as claimed in claim 10, the current-mode controlled DC/DC converter is a buck-boost converter. The multiplication factor is 1+Vo/Vb, wherein Vb is the input voltage, and Vo is the output voltage.

In an embodiment in accordance with the invention as claimed in claim 11, for the buck-boost converter, the correction circuit generates the correction signal as $$(1/(1+k))*(\ln(1+k)-0.5*k/(1+k))*T*Vb/L$$

wherein ln is the natural logarithm, k=Vo/Vb, Vo is the output voltage, Vb is the input voltage, T is a duration of one period of the periodically varying inductor current, and L an inductance of the inductor.

In an embodiment in accordance with the invention as claimed in claim 12, the current-mode controlled DC/DC converter is a boost converter. The multiplication factor is Vo/Vb, wherein Vb is the input voltage, and Vo is the output voltage.

In an embodiment in accordance with the invention as claimed in claim 13, for a boost converter, the correction circuit generates the correction signal as $$(Vb/Vo)*(Vo-Vb)*T/2L$$

wherein Vo is the output voltage, Vb is the input voltage, T is a duration of one period of the periodically varying inductor current, and L an inductance of the inductor.

In an embodiment in accordance with the invention as claimed in claim 14, the current-mode controlled DC/DC converter further comprises a slope compensation circuit which generates the slope compensation signal for which is compensated in the equations mentioned hereinbefore. A slope compensation circuit as such is well known from the prior art. Again, the correction circuit adds the correction signal to the control signal to obtain a modified control signal. Now, the correction signal is, or is representative for, a sum of on the one hand the level of slope compensation signal at the switch off instant of the switch and on the other hand the difference between the peak current and the average current through the inductor. The difference between the peak current and the average current through the inductor was already catered for, the additional attenuation introduced by the slope compensation is also removed. Consequently, the control signal is representative for the average current through the inductor.

In an embodiment in accordance with the invention as claimed in claim 15, the current-mode controlled DC/DC converter further comprises a limiting circuit to limit a minimum and/or maximum value of the control signal. Now the control signal is representative for the average current through the inductor, such a limiting circuit directly limits this average current.

In an embodiment in accordance with the invention as claimed in claim 16, the signals are currents which are summed at a node. The current-mode controller comprises a controlled current source which supplies a control current determined by the control signal to the node. The correction circuit comprises a current source which supplies the correction signal as a correction current to the node. A sense circuit senses the inductor current and supplies the sensed signal as a sensed current to the node. The polarities of the control current and the correction current are the same and are opposite to a polarity of the sensed current. Thus, if, for example, the sensed current flows towards the node, both the control current and the correction current flow away from the node. The drive circuit is coupled to the node to determine when the level of the sensed current crosses the level of the sum of the control current and the correction current. If the sensed current crosses this sum, the switch is switched off.

In an embodiment in accordance with the invention as claimed in claim 17, the current-mode controlled DC/DC converter further comprises a slope compensation circuit to supply a slope compensation current to the node. The polarity of the slope compensation current is equal to the polarity of the sensed current. The current source of the correction circuit now supplies a correction current which is a sum of the level of said slope compensation signal at the switch-off instant DT at which the drive circuit 3, 4 switches off the controllable switch and the current representative for the difference between the peak current and the average current through the inductor. The correction current should not comprise the time-dependency of the slope compensation waveform because this would compensate for the effect of the compensation waveform, which of course is not what is intended.

In an embodiment in accordance with the invention as claimed in claim 18, the current-mode controller comprises a comparator which compares the reference voltage and the output voltage to obtain the error voltage. Usually, the comparator is a subtractor which subtracts the output voltage from the reference voltage to obtain the error voltage. The current-mode controller further comprises a PI controller which receives the error voltage to supply the control signal. The correction circuit now supplies a correction current which, for example, for a buck converter is substantially equal to $(T*Vo)/2L$, wherein T is a duration of a switching cycle, Vo is the output voltage, and L is an inductor value of the inductor.

In an embodiment in accordance with the invention as claimed in claim 19, the current-mode controller comprises an I-controller which is a well known controller with an integrating action. The I-controller has an input which allows influencing the integrating action of the I-controller. The current-mode controlled DC/DC converter further comprises a first additional current source to supply a first current proportional to the control current to a further node, and a second additional current source to supply a predetermined fixed second current to the further node. A voltage at the further node is dependent on a difference between the first and the second current. A clamping circuit limits the voltage at the further node. An amplifier has an input connected to the further node and an output connected to the input of the I-controller to influence the integrating action. As long as the clamping circuit does not limit the voltage at the node, the difference current is absorbed by the clamping circuit and the amplifier does not influence the integrating action. When the voltage at the node has reached the limit value, the difference current is fed to the amplifier which influences the integrating action to limit the control current. The closed loop formed limits the control current to the predetermined fixed second current.

In an embodiment in accordance with the invention as claimed in claim 20, the second current indicates a maximum current level, and the amplifier decreases the integrating action when the first current surpasses the second current. Thus, the maximum value of the control current is limited.

In an embodiment in accordance with the invention as claimed in claim 21, the second current indicates a minimum current level, and the amplifier increases the integrating action when the first current drops below the second current. Thus, the minimum value of the control current is limited.

In an embodiment in accordance with the invention as claimed in claim 22, the current-mode controlled DC/DC converter further comprises a third additional current source which supplies a third current proportional to the correction current to the further node, and wherein the amplifier increases the integrating action when the first current drops below the sum of the second current and the third current. Now, the modified control current is limited to a minimum value.

In an embodiment in accordance with the invention as claimed in claim 23, the I-controller comprises an integrating capacitor, and the output of the amplifier is connected to the integrating capacitor.

These and other aspects of the invention are apparent from and will be elucidated with reference to the embodiments described hereinafter.

DETAILED DESCRIPTION OF THE PREFERRED EMBODIMENT

Figure 1:
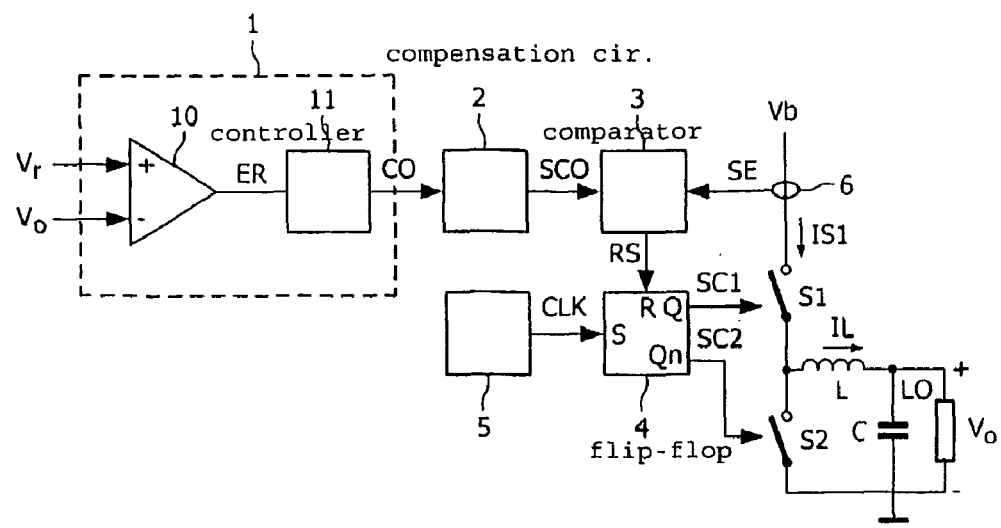
FIG. 1 shows a block diagram of a prior art current-mode controlled DC/DC converter.
Figure 2:
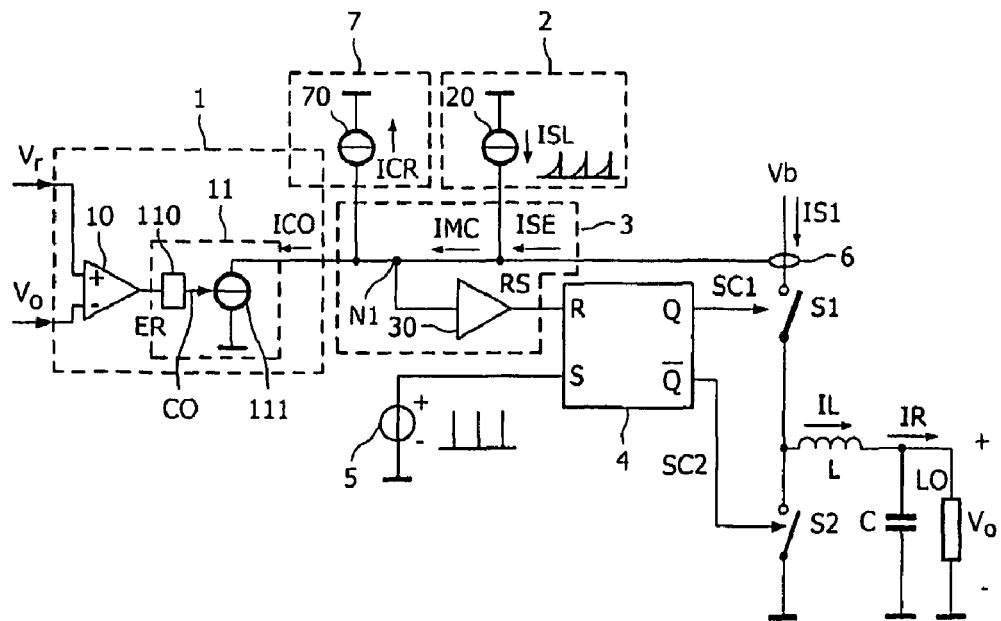
FIG. 2 shows a circuit diagram of an embodiment of a current-mode controlled DC/DC buck converter in accordance with the invention.
Figure 12:
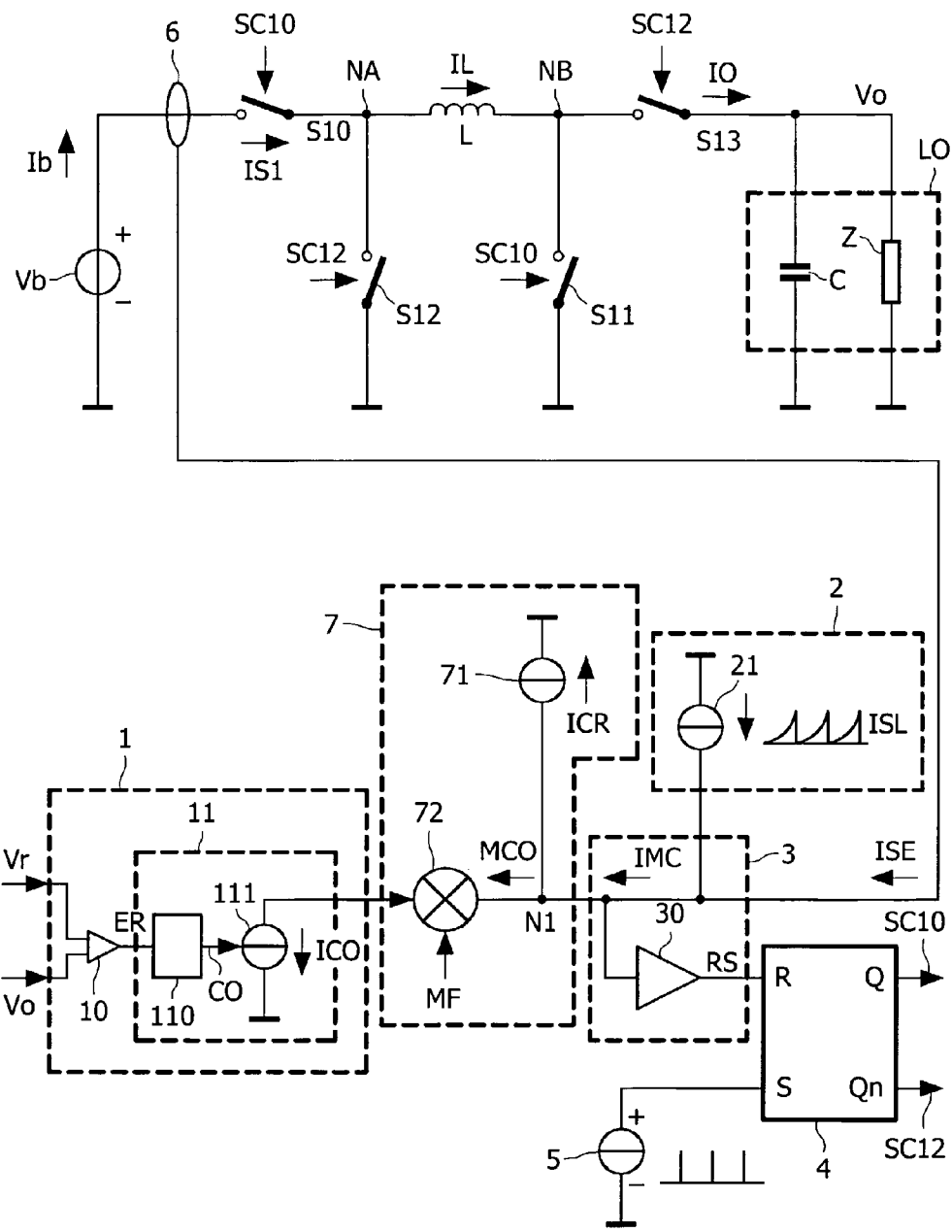
FIG. 12 shows a circuit diagram of an embodiment of a current-mode controlled DC/DC buck-boost converter in accordance with the invention.
Figure 14:
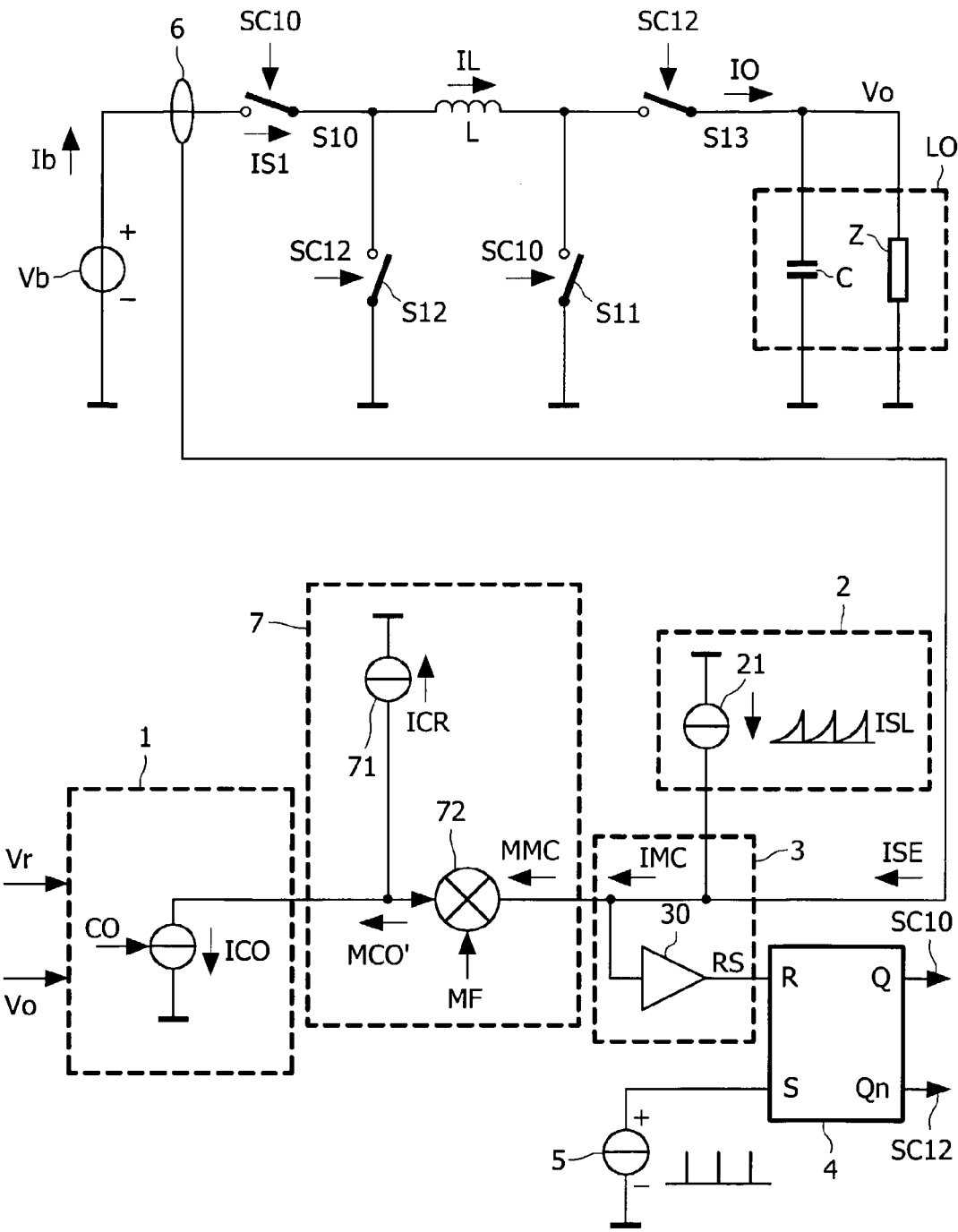
FIG. 14 shows a circuit diagram of another embodiment of a current-mode controlled DC/DC buck-boost converter in accordance with the invention.
Figure 15:
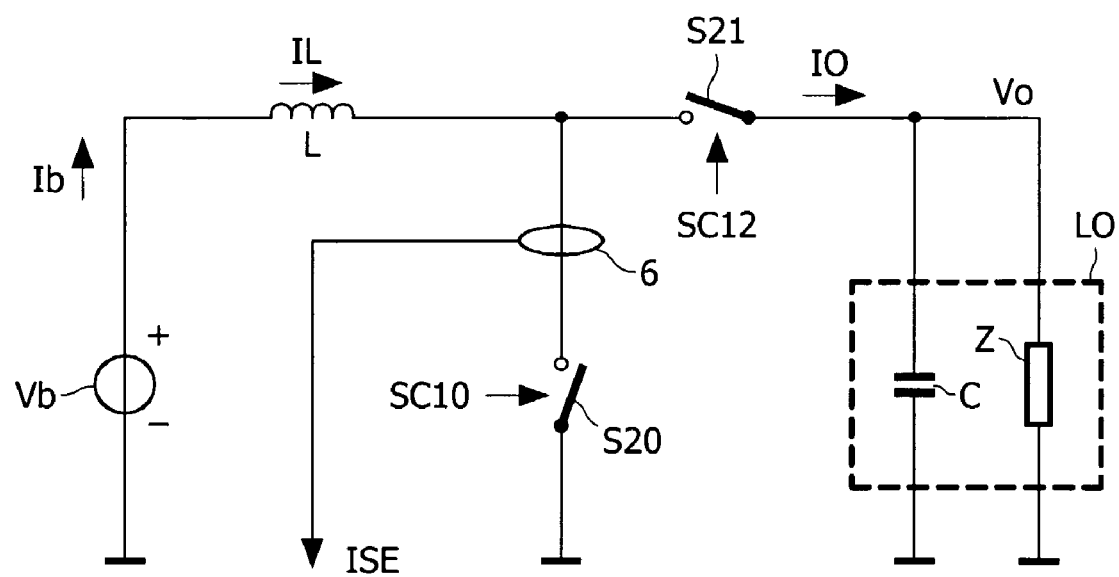
FIG. 15 shows a circuit diagram of a current controlled DC/DC boost converter for use in the circuit diagrams of FIG. 12 or 14 instead of the buck-boost converter.

FIG. 1 shows a block diagram of a prior art current-mode controlled DC/DC converter. Especially in telecom systems wherein a handheld has to manage the transmission power economically to increase the battery life, the power supply voltage of a transmitting output amplifier should be controlled to optimally suite the actual transmission power. The current-mode DC/DC converter which supplies the power supply voltage should be able to modulate its output voltage fast and accurate. It has to be noted that FIGS. 1 and 2 show a buck-converter topology which comprises the switches S1, S2 and the inductor L, FIGS. 12 and 14 show a buck-boost converter topology which comprises the switches S10 to S13 and the inductor L, and FIG. 15 shows a boost converter topology which comprises the switches S20 and S21. In the now following, the current-mode DC/DC converter is also referred to as converter which may be any of the converter topologies mentioned above. Further, it has to be noted that in the claims is referred to a controllable switch S1 which may be any or any combination of the switches above, which dependent on the converter topology selected, may have another reference in the Figs. than S1. The actual converter topology is not relevant to the essence of the present invention which resides in the controller topology. The controller topology has been adapted to at least add a correction signal ICR to the control signal ICO. The correction signal ICR is representative for a difference between the original control signal ICO if no correction signal is present, and the average current ILA through the inductor L.

The converter comprises a current-mode controller 1 which supplies a control signal CO dependent on a difference between the output voltage Vo of the converter and a reference voltage Vr. The reference voltage Vr is varied to obtain a corresponding varying output voltage Vo. The current mode-controller 1 comprises a subtractor (10) which subtracts the output voltage Vo from the reference voltage Vr to supply an error signal ER which represents the difference between the reference voltage Vr and the output voltage Vo. The current-mode controller 1 further comprises a controller 11 which processes the error signal ER to obtain the control signal CO. Usually, the controller 11 is a P (Proportional) controller, an I (Integrating) controller, a PI (Proportional and Integrating) controller, or a PID (Proportional, Integrating and differentiating) controller.

The slope compensation circuit 2 subtracts a slope compensation signal from the control signal CO to obtain a slope compensated control signal SCO. Usually, the slope compensation signal is sawtooth, parabola, or piecewise-linearly shaped. A sense circuit 6 senses the current IS1 which flows through the switch S1. The sense circuit 6 may sense any current which is representative for the inductor current IL through the inductor L. For example, the sense circuit 6 may be arranged in series with the inductor L to sense the inductor current IL directly, or the sense circuit 6 may be arranged in series with the switch S1 (as shown) or in series with the switch S2. If the sense circuit 6 is arranged in series with one of the switches S1 or S2, the inductor current IL is only sensed during the period in time the associated switch is closed. The sense signal SE which should be representative for the inductor current IL may also be sensed as a voltage, for example this voltage may be sensed over the main current path of one of the switches S1 or S2. Preferably, the switches S1 and S2 are MOSFET's, but bipolar transistors or other controllable semiconductor devices may also be used.

The comparator 3 compares the sensed signal SE with the slope compensated control signal SCO to supply a reset signal RS to the reset input R of the Set-Reset Flip-Flop 4 when the level of the sensed signal SE reaches the level of the slope compensated control signal SCO. Instead of the Set-Reset Flip-Flop 4, a more complicated circuit may be used. An oscillator 5 generates a clock signal CLK which is supplied to the set-input S of the Set-Reset Flip-Flop 4. The non-inverting output Q of the Set-Reset Flip-Flop 4 supplies a control signal SC1 to a control input of a switch S1, and the inverting output Qn of the Set-Reset Flip-Flop 4 supplies a control signal SC2 to a control input of a switch S2. However, the control of the synchronous switch S2 may be more complicated. It is also possible that the switch S2 is a diode. Then, of course, no control signal is required. When the Set-Reset Flip-Flop 4 is reset by the reset signal RS of the comparator 3, the switch S1 is opened and the switch S2 is closed. When the Set-Reset Flip-Flop 4 is set by a clock pulse CLK on the set input S, the switch S1 is closed and the switch S2 is opened.

The main current paths of the switches S1 and S2 are arranged in series between the terminals of a DC power supply which supplies the input voltage Vb to the converter. An inductor L is arranged between the junction of the main current paths of the switches S1 and S2 and the output of the converter where the output voltage Vo is supplied. A parallel arrangement of a smoothing capacitor C and a load LO is present at the output of the converter. The current through the inductor is indicated by IL.

The operation of the prior art buck converter is briefly elucidated in the now following. It is assumed that the starting situation is that the clock pulse CLK sets the Set-Reset Flip-Flop 4. Now, the switch S1 is closed and the switch S2 is opened causing the inductor current IL to increase. The inductor current IL increases until the sensed signal SE is equal to the compensated control signal SCO. Now the Set-Reset Flip-Flop 4 is reset by the reset signal RS, the switch S1 is opened and the switch S2 is closed. The inductor current IL decreases until Set-Reset Flip-Flop 4 is set again by a next clock pulse CLK.

FIG. 2 shows a circuit diagram of an embodiment of the current-mode controlled DC/DC converter in accordance with the invention. This embodiment is based on the block diagram of the prior art converter shown in FIG. 1. FIG. 2 shows a possible implementation in an integrated circuit which uses current sources.

First, the circuit equivalent with the converter shown in FIG. 1 is discussed. The current source 70 which supplies the correction current ICR is assumed to be not yet present. The current-mode controller 1 comprises the same subtractor 10 which receives the reference voltage Vr and the output voltage Vo to supply the same error signal ER. The controller 11 now comprises a P, an I, PI, or PID controller 110 which generates the control signal CO from the error signal ER. The control signal CO controls a current source 111 to draw a control current ICO from a node N1. The slope compensation circuit 2 comprises a current source 20 which supplies a slope compensation current ISL to the node N1. The sense circuit 6 now supplies a sensed current ISE, which is representative for the inductor current IL, to the node N1. A voltage at the node N1 is determined by the sum of the currents ICO, ISE and ISL. The comparator 3 now comprises the amplifier 30 which supplies the reset signal RS which indicates when the level of the sensed current ISE becomes equal to the difference of the control current ICO and the slope compensation current ISL. Both the oscillator 5 and the Set-Reset Flip-Flop 4 are identical to the same items shown in FIG. 1. Also the topology formed by the switches S1, S2, the inductor L, the capacitor C and the load LO is identical to that shown in FIG. 1. The operation of this implementation in an integrated circuit of the known converter, and the drawbacks thereof are elucidated in detail with respect to the signals shown in FIG. 3.

In an embodiment of the converter in accordance with the present invention, a correction circuit 7 is added. In the embodiment shown in FIG. 2, the correction circuit 7 comprises a current source 70 which draws a correction current ICR out of the node N1. The operation of this embodiment is elucidated in detail with respect to the signals shown in FIG. 4. Alternative embodiments of the correction circuit 7 are discussed with respect to FIGS. 5 and 6.

Figure 3:
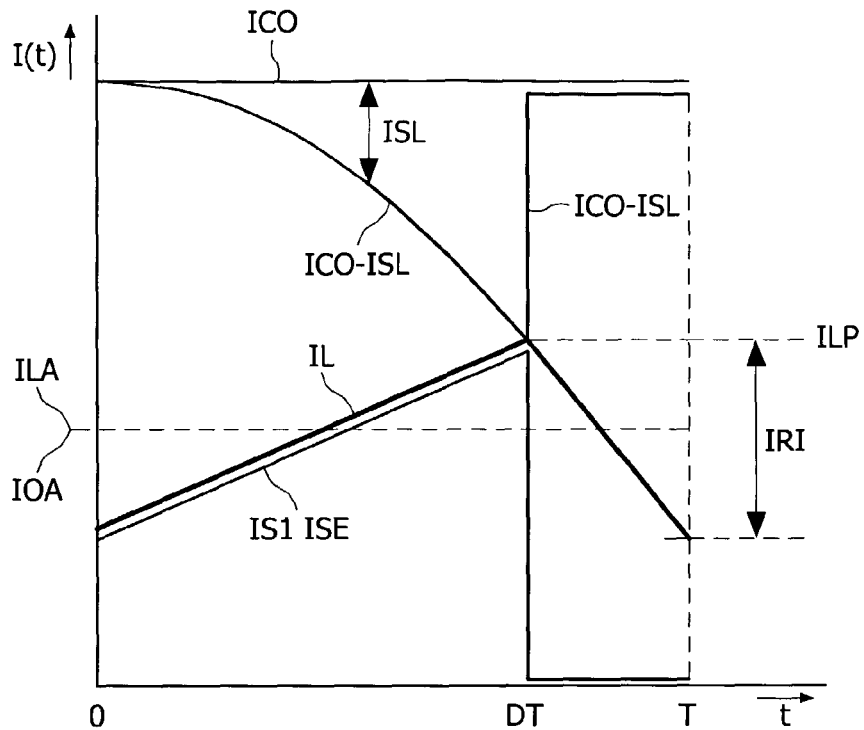
FIG. 3 shows signals elucidating the operation of the prior art current-mode controlled DC/DC converter.

FIG. 3 shows signals elucidating the operation of the prior art current-mode controlled DC/DC converter. FIG. 3 shows a steady state situation wherein the level of the inductor current IL at the end t=T of a switching period T is identical to the level of the inductor current IL at a start t=0 of a switching period T. The current IS1 through the switch S1 is identical to the inductor current IL during the on-period lasting from the instant 0 to the instant DT during which the switch S1 is closed. The sensed current ISE is proportional to the current IS1 through the switch S1. The control current ICO has a predetermined constant level in the steady state. The difference current of the control current ICO and the slope compensation current ISL is shown as the curve indicated by ICO-ISL. At the instant DT, the sensed current ISE becomes equal to the difference current ICO-ISL and the Set-Reset Flip-Flop 4 is reset. The switch S1 is opened and the switch S2 is closed. Now, during the off-period which lasts from the instant DT to the instant T: the inductor current IL decreases. The current IS1 through the switch S1 and thus the sensed current ISE drop to zero, the slope compensation current ISL is switched off (ISL=0) and the difference current ICO-ISL becomes equal to the control current ICO. It has to be noted that in a practical embodiment the currents may be scaled versions of the real currents. The average inductor current ILA is indicated by the dashed line. In a buck converter, the average output current IOA is the current supplied to the parallel arrangement of the smoothing capacitor C and the load LO. This average output current is averaged over the switching period T. For a boost converter, which has a switch S2 at its output, the current supplied to this parallel arrangement differs from the average current ILA through the inductor L.

From FIG. 3 it becomes clear that the gain from the control current ICO to the average output current IOA is not 1. This is caused by the slope compensation current ISL and the ripple IRI on the inductor current IL. The slope compensation current ISL causes the control current ICO to be larger than the peak inductor current ILP. The ripple current IRI causes the average inductor current ILA to be lower than the peak inductor current ILP. The gain Ai from the control current ICO to the average output current IOA is $$Ai=IOA/ICO$$

To elucidate the effect on the small-signal bandwidth of the current-mode controlled DC-DC buck converter, it is assumed that the controller 11 is a PI-controller, such that the transfer from the inputs (Vr and Vo) to the output (ICO) of the current-mode controller 1 is $$ICO/(Vr-Vo)=gHF*(1+j\omega\tau)/j\omega\tau$$

wherein gHF is the value of the high-frequency transfer (the proportional part), and τ is the time constant of the integrating part.

The output voltage Vo is filtered by the capacitor C, and the load LO is considered to be a resistor. Therefore, the transfer from the average output current IOA to the output voltage Vo is $$Vo/IOA=R/(1+j\omega RC)$$

The open loop gain from the differential input voltage Vr–Vo to the output voltage Vo is thus $$Vo/(Vr-Vo)=Ai*gHF*R*(1+j\omega\tau))/(j\omega\tau*(1+j\omega RC))$$

The open loop gain has a low-frequency pole at fp=1/(2ωRC) and a high-frequency zero at fz=1/(2ωτ).

The unity-gain frequency of the open-loop gain is $$f1=(Ai*gHF)/(2\omega C)$$

The closed-loop gain has a –3 dB bandwidth f3 which can be approximated by the unity-gain frequency f1 of the open-loop. Thus, the closed-loop –3 dB bandwidth f3 depends on the value of the output capacitor C, the high-frequency transfer gHF, and the gain Ai of the transfer from control current ICO to average output current IOA. The values of the capacitor C and the transfer gHF are well known, however, the value of the gain Ai is smaller than 1, and is not fixed. Due to the fact that Ai is smaller than 1, the closed-loop bandwidth of the transfer from reference voltage Vr to output voltage Vo is smaller than maximal possible. This is a disadvantage because it limits the possibilities of the converter to accurately follow fast variations of the reference voltage Vr at the output.

Figure 4:
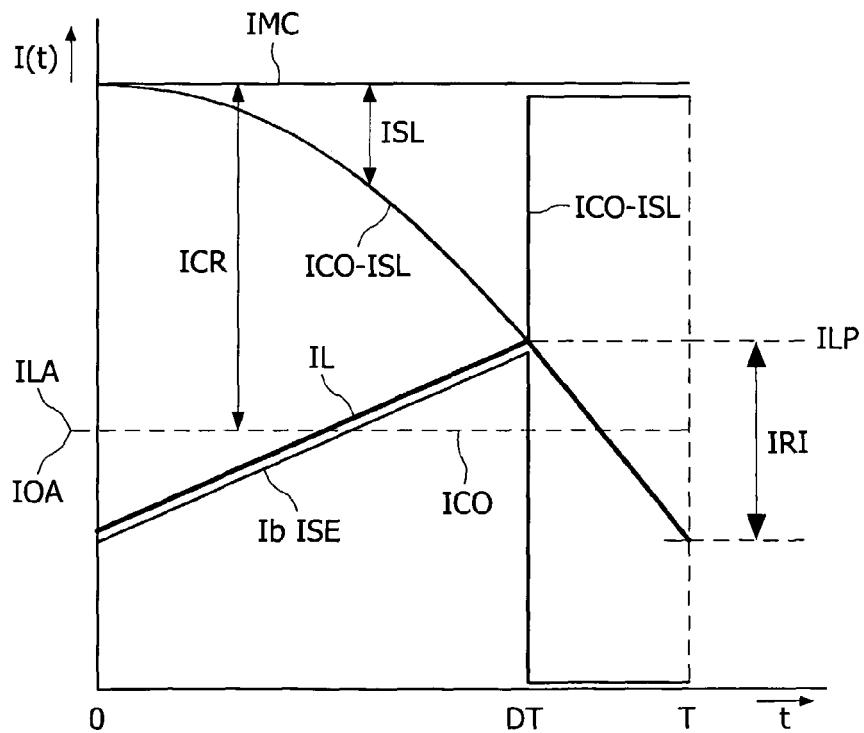
FIG. 4 shows signals elucidating the operation of the current-mode controlled DC/DC converter shown in FIG. 2.

FIG. 4 shows signals elucidating the operation of the current-mode controlled DC/DC converter shown in FIG. 2. Now, the correction circuit 7 has been added which comprises a current source 70 which draws a correction current ICR out of the node N1. Because, in the same steady state, the same current IS1 flows through the switch S1, the sensed current ISE is identical to that of the prior art converter. Also, the slope compensation current ISL is considered to be identical to that of the prior art converter. Again, in the same steady state, the total current at the node N1 should cause a reset of the Set-Reset Flip-Flop at the same instant DT. Consequently, the effect of adding the correction circuit 7 is that the control current ICO must decrease exactly with the value of the correction current ICR.

Thus, if the correction current ICR is selected to be equal to the sum of the level of the slope compensation current ISL at the switch off instant DT and half the ripple current IRI, the control current ICO becomes equal to the average inductor current ILA. Consequently, the gain Ai of the transfer from control current ICO to average output current IOA becomes equal to 1 and the closed-loop bandwidth of the transfer from reference voltage Vr to output voltage Vo has its maximum value.

In the now following, the operation of the converter which has such a correction circuit 7 is elucidated. Again, by way of example only, the converter is a buck converter, and the controller 110 is a PI controller. Further, the current source 70 draws the correction current ICR from the node N1, by way of example, near to the current source 111 which draws the control current ICO from the node N1. The sum of the correction current ICR and the control current ICO is denoted by the sum-current IMC which is drawn out of the node N1. The sum of the slope compensation current ISL and the sensed current ISE is flowing towards the node N1. Thus the Set-Reset Flip-Flop 4 will be reset at the instant DT that the sensed current ISE reaches the level of sum-current IMC from which the slope compensation current ISL is subtracted. The sum-current IMC is also referred to as the modified control signal (MCO in FIGS. 5 and 6).

In FIG. 4, it is assumed that the correction current ICR has a value such that the modified control signal IMC has the same level as the control signal ICO in FIG. 3. Consequently, the control signal ICO in FIG. 4 corresponds directly with the average inductor current ILA and the average output current IOA. The word "corresponds" is used to indicate that scaled versions of the actual currents may be used. In all other aspects, FIG. 4 is identical to FIG. 3.

In the now following calculation, the value of the correction current ICR is determined for a buck-converter wherein the slope compensation is parabola shaped. From FIG. 3 it follows that the difference between the control current ICO and the average output current IOA is $$ICO-IOA=ISL(DT)+IRI/2$$

wherein ISL(DT) is the slope compensation current at the instant DT at which the switch S1 is switched off, and IRI is the peak to peak ripple current through the inductor current IL. The optimal slope compensation current ISL for a buck-converter is $$ISL(t)=\tfrac{1}{2}*(t/T)^2*(T/L)*Vb=(t^2Vb)/2TL$$

wherein t/T is the relative position in a clock cycle with duration T, L is the inductor value of the inductor L, and Vb is the DC input voltage of the converter. This input voltage may be supplied by a battery.

At the instant of switching off the switch S1 (which is also referred to as the control switch), the slope compensation current ISL has the value $$ISL(DT)=\tfrac{1}{2}*D^2*(T/L)*Vb$$

wherein D is the steady state value of the duty cycle, which, if neglecting losses, is Vo/Vb. The peak to peak ripple current on the coil current ILA or the output current IOA is for a buck-converter $$IRI=DT*(Vb-Vo)/L$$

With the above equations, the difference between the control current ICO and the average output current IOA is $$ICO-IOA=ISL(DT)+IRI/2=(T*Vo)/(2L)$$

Consequently, if the correction current ICR has this value (T*Vo)/(2L), the control current ICO becomes equal to the average inductor current ILA and thus also to the average output current IOA. It has to be noted that the correction current ICR is a positive feedback current.

The current gain Ai which describes the transfer from the control current ICO to the average output current IOA, now has a unity magnitude. Consequently, the −3 dB bandwidth f3 of the loop has increased to $$f3 \approx gHF/(2\pi C).$$

A further advantage is that the −3 dB bandwidth depends on two well known quantities only.

A similar improvement of the reaction speed is obtained if other converter topologies than a buck-converter are used, or when the PI controller has another behavior, or when the slope compensation has a different shape or is not present at all.

Figure 5:
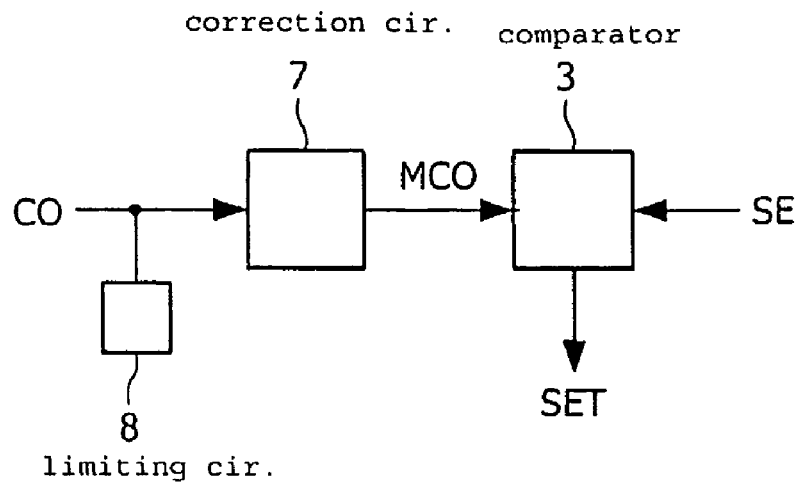
FIG. 5 shows a block diagram of another embodiment of the current-mode controlled DC/DC converter in accordance with the invention.

FIG. 5 shows a block diagram of another embodiment of the current-mode controlled DC/DC converter in accordance with the invention. FIG. 5 shows an adaptation of the prior art converter shown in FIG. 1. Now the correction circuit 7 is inserted between the controller 11 and the comparator 3, while the slope compensation circuit 2 has been left out. Optionally, a limiting circuit 8 is added to limit the maximum or minimum value of the control signal CO. Because the control signal CO is now representative for the average output current IOA, the limiting circuit 8 limits the average output current IOA of the converter. The correction circuit 7 receives the control signal CO and supplies a modified control signal MCO to the comparator 3. The limiting circuit 8 is further elucidated with respect to FIGS. 7 to 9.

Figure 6:
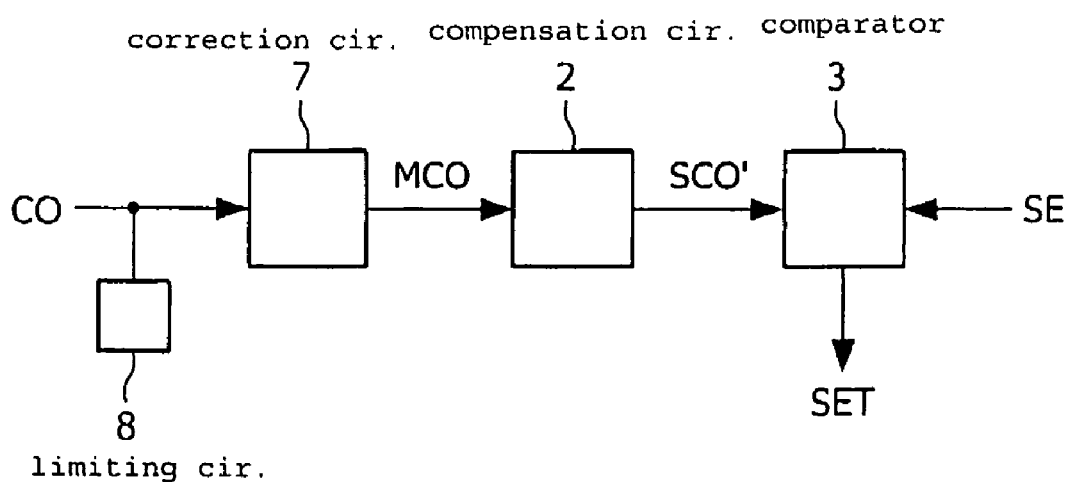
FIG. 6 shows a block diagram of yet another embodiment of the current-mode controlled DC/DC converter in accordance with the invention.

FIG. 6 shows a block diagram of yet another embodiment of the current-mode controlled DC/DC converter in accordance with the invention. FIG. 6 shows an adaptation of the prior art converter shown in FIG. 1. Now the correction circuit 7 is inserted between the current-mode controller 11 and the slope compensation circuit 2. Again, optionally, the limiting circuit 8 is added to limit the maximum or minimum value of the control signal CO. The correction circuit 7 receives the control signal CO and supplies a modified control signal MCO to the slope compensation circuit 2. The slope compensation circuit 2 supplies the modified control signal SCO' to the comparator 3.

Figure 7:
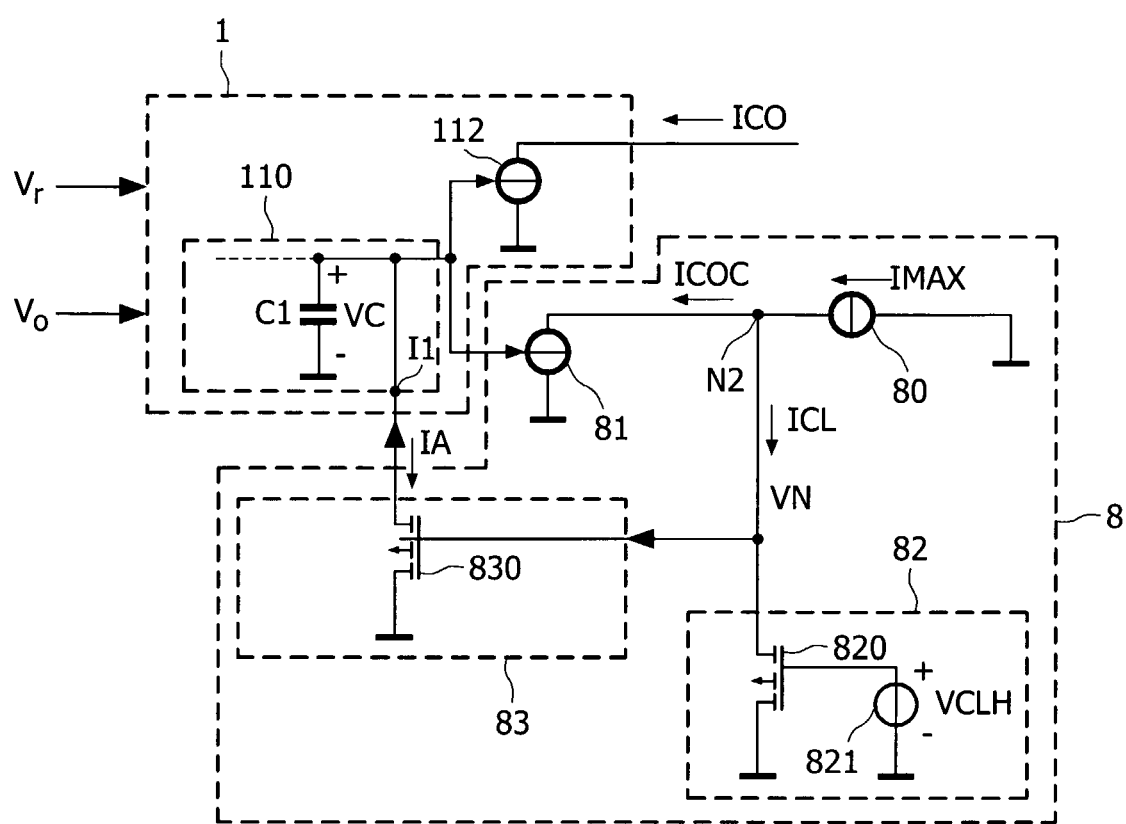
FIG. 7 shows a circuit diagram of an embodiment of the current-mode controlled DC/DC converter in which the control signal is limited to a maximum value, FIG. 8 show signals elucidating the limitation of the control signal to a maximum value.

FIG. 7 shows a circuit diagram of an embodiment of the current-mode controlled DC/DC converter in which the control signal is limited to a maximum value. The current-mode controller 1 comprises the I-controller 110 and the current source 112. Thus, the controller 11 shown in FIG. 1, is shown in this FIG. 7 to comprise the I-controller 110. However, in FIG. 7, also a P-controller and/or a D-controller (not shown) may be present which provide controlling signals to the current sources 112 and 81. By way of example, the integrating action of the I-controller 110 is obtained by the capacitor C1. The voltage VC across the capacitor C1 is supplied both to the current source 112 to obtain the control current ICO and to the control source 81 of the limiting circuit 8 to obtain a copy current ICOC of the control current ICO. The copy current ICOC is drawn out of a node N2. The copy current ICOC may be a scaled version of the control current ICO. The limiting circuit 8 further comprises a current source 80, a clamping circuit 82 and an amplifier 83. The current source 80 supplies the current IMAX to the node N2. The current IMAX represents the maximum value to which the copy current ICOC should be limited. The clamping circuit 82 is coupled to the node N2 to limit the voltage VN at this node N2 to a maximum value. The input of the amplifier 83 receives the voltage VN and its output is connected to the input of the I-controller 110 to decrease the integrating action if the copy current ICOC surpasses the current IMAX.

FIG. 7, as an example only, shows a particular embodiment of the clamping circuit 82 and the amplifier 83. The clamping circuit 82 and the amplifier 83 are designed such that always only one of them conducts current. The clamping circuit 82 comprises a FET 820 which has a main current path arranged between the node N2 and a reference potential, which in FIG. 7 is ground. A voltage source 821 which supplies a voltage level VCLH is connected to the control electrode of the FET 820. The amplifier 83 comprises a FET 830 which has a control electrode connected to the node N2, and a main current path connected between the input I1 of the I-controller 110 and the reference potential. As long as the copy current ICOC is smaller than the maximum current IMAX, the clamping circuit 82 sinks the difference current ICL and limits the voltage VN to a maximum value. As soon as the copy current ICOC becomes larger than the maximum current IMAX, the difference current ICL changes polarity and the voltage VN drops. Due to the decreased level of the voltage VN, the clamping circuit 82 stops sinking current, and the amplifier 83 starts to draw current from the capacitor C1 to decrease the integrating action. The control loop, created by the limiting circuit 8 when the amplifier 83 is active, is designed to have a large open loop amplification factor such that the integrating action is influenced to obtain a copy current ICOC which is limited to the maximum current IMAX. Consequently, also the control current ICO, and thus the average output current IOA, is limited to a maximum value. The operation of the limiting circuit 8 of FIG. 7 is elucidated in more detail with respect to FIG. 8.

FIG. 8 show signals elucidating the limitation of the control signal to a maximum value. FIG. 8A shows the differential input voltage Vr–Vo, or the error signal ER of the controller 11, wherein Vr is the controller reference voltage and Vo is the output voltage of the converter which has to vary in accordance with the variations of the reference voltage Vr. FIG. 8B shows the voltage VC on the capacitor C1 of the I-controller 110. FIG. 8C shows the copy current ICOC and the control current ICO. It is assumed that the copy current ICOC is equal to the control current ICO. However, in a practical implementation, the copy current may be a scaled version of the control current ICO. FIG. 8D shows the difference current ICL, FIG. 8E shows the voltage VN at the node N2, and FIG. 8F shows the current IA drawn out of the integrating capacitor C1.

At the instant t0 the differential input signal Vr–Vo is increased. It is assumed that the controller is operating in an open-loop mode The I-controller 110 starts charging the capacitor C1 and the voltage VC starts increasing. It is assumed that the controller 11 is a PI-controller. The control current ICO and its copy ICOC show a proportional increment (indicated by P in FIG. 8C), and an integrating increment (indicated by I in FIG. 8C). The difference current ICL is flowing towards the clamping circuit 82, the voltage VN is high and thus the clamping circuit 82 is able to sink the decreasing difference current ICL. The difference current ICL decreases because the increasing copy current ICOC comes nearer to the maximum current IMAX supplied to the node N2 by the current source 80. The current IA conducted by the amplifier is zero due to the high level of the voltage VN.

At the instant t1, the copy current ICOC becomes equal to the maximum current IMAX. Now, the difference current ICL becomes zero or slightly negative and the voltage VN drops to a low level. Consequently, the clamping circuit 82 stops conducting and the amplifier 83 starts conducting the current IA. Now a feedback loop is formed. The amplifier 83 has a large current gain, thus equilibrium in the feedback loop is restored when the copy current ICOC becomes equal to the maximum current IMAX, because the input current of the amplifier 83 is negligible. Thus, the copy current ICOC is limited to the maximum value IMAX.

At the instant t2, the differential input voltage Vr–Vo is further increased. The proportional part of the controller 11 outputs a higher proportional current in the control current ICO and its copy ICOC. This additional current is not shown in FIG. 8C because it will be immediately compensated by the compensating action of the amplifier 83 which increases the current IA to compensate for the extra proportional current. This extra current IA is obtained by a further decrease of the voltage VN at the node N2.

At the instant t3, the reference voltage is decreased such that the input difference voltage Vr–Vo becomes negative. The proportional part in the controller 11 outputs a negative proportional contribution P' in the control current ICO and its copy ICOC which values now immediately drop below the maximum value IMAX. The voltage VN quickly rises, the amplifier current IA stops flowing, and the clamping circuit 82 starts conducting the increasing difference current ICL. The current limiting loop is now opened and the voltage VC on the capacitor C1 is not anymore influenced by the limiting circuit 8. Due to the negative input difference voltage Vr–Vo, the voltage VC on the capacitor C1 starts decreasing.

The following considerations are important in selecting an appropriate value of the maximum current IMAX. The value preferably is selected such that the limiting circuit 8 limits the control current ICO before the protection of the maximum current through the transistor switch S1 is activated, and before the inductor L is saturated.

It has to be noted that, although the limiting circuit 8 is elucidated with respect to an analog integrator with the capacitor C, the integrator may also be implemented with digital circuits such as a counter. The amplifier now has to act on the up-down counting mechanism of the counter. The controller 11 may also lack the P-action and/or may include a D-action.

It has further to be noted that existing protection circuits which have to protect the switches S1 and S2 against too large currents are unable to limit the average output current IOA of the converter. Instead, they limit the maximum current through the switches because of the presence of the ripple current. However, the ripple current varies with the output voltage. The ripple current amplitude is maximal when the output voltage is approximately half the battery voltage Vb, and the ripple current amplitude is approaching zero for output voltages near zero volt or near the battery voltage Vb.

A first known protection circuit, senses the current through the control switch S1 and compares it which a maximum value. The control switch S1 is immediately reset when is detected that the current through the control switch becomes larger than the maximum value. The controller will respond with increasing the control current, and the next switching cycle, again the control switch S1 will be immediately reset when is detected that the current through the control switch becomes larger than the maximum value. This will last until the cause of the too large current is taken away. In fact, the limiting loop is not a closed loop, and thus it will take a considerable amount of time to recover from an over-current state.

A second known protection circuit limits the control voltage across the integrating capacitor to a maximum value. A main current path of a transistor is arranged in parallel with the integrating capacitor, the control electrode of the transistor receives a reference voltage. If the voltage across the integrating capacitor crosses a predetermined level, the transistor starts conducting and the voltage across the capacitor is limited. However, the maximum current which can be conducted by the control switch S1 decreases with increasing duty cycle because the slope compensation signal increases with increasing duty cycle.

A third known protection circuit comprises a voltage clamp which clamps the voltage at an output of a buffer which buffers the voltage across the integrating capacitor. The voltage at which the output of the buffer is limited depends on the slope compensation. Now, the level at which the current is limited depends less on the slope compensation signal. However, this prior art has the same drawback as the first mentioned prior art: the control loop is not closed during the limiting action and consequently, the voltage over the integrating capacitor drifts away as discussed with respect to this first mentioned prior art.

Figure 9:
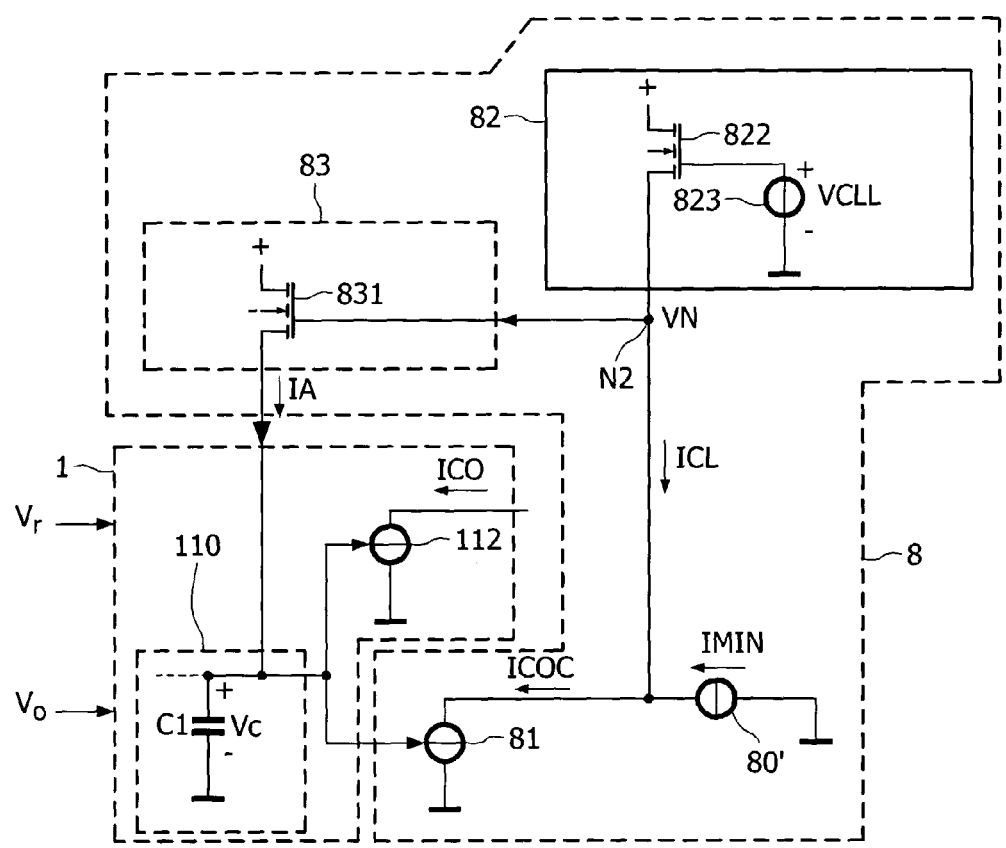
FIG. 9 shows a circuit diagram of an embodiment of the current-mode controlled DC/DC converter in which the control signal is limited to a minimum value.

FIG. 9 shows a circuit diagram of an embodiment of the current-mode controlled DC/DC converter in which the control signal is limited to a minimum value. The current-mode controller 1 is identical to that shown in FIG. 7. Thus, as in FIG. 7, the voltage VC across the capacitor C1 is supplied to the current source 112 to obtain the control current ICO, and to the control source 81 of the limiting circuit 8 to obtain a copy current ICOC of the control current ICO. Again, the copy current ICOC is drawn out of the node N2. The copy current ICOC may be a scaled version of the control current ICO. The limiting circuit 8 further comprises a current source 80', a clamping circuit 82 and an amplifier 83. The current source 80' supplies the current IMIN to the node N2. The current IMIN represents the minimum value to which the copy current ICOC should be limited. The clamping circuit 82 is coupled to the node N2 to limit the voltage VN at this node to a minimum value. The input of the amplifier 83 receives the voltage VN and its output is connected to the input of the I-controller 110 to increase the integrating action if the copy current ICOC crosses the current IMIN.

The operation of the limiting circuit 8 shown in FIG. 9 is comparable to that of the limiting circuit 8 shown in FIG. 7. Briefly, as long as the copy current ICOC is larger that the minimum current IMIN, the voltage VN at the node N2 is low and the difference current ICL is conducted by clamping circuit 82. The amplifier 83 is inactive and the current IA is zero. When the copy current ICOC becomes equal to the minimum current IMIN, the voltage VN increases causing the clamping circuit 82 to stop conducting current and the amplifier 83 to start supplying current into the capacitor C1 to prevent the copy current ICOC to further decrease.

Before discussing the selection of the proper value of the minimum current IMIN, first the operation is considered of the circuit of FIG. 2, but without the correction circuit 7, as elucidated with respect to FIG. 3. In this prior art circuit, the reset input R of the Set-Reset Flip-Flop 4 becomes active (high) at the instant DT at which the current through the control switch S1 becomes equal to or larger than a difference control current ICO-ISL which is equal to the control current ICO minus the slope compensation current ISL, see FIG. 3. As a result, the control switch S1 becomes non-conductive and the slope compensation current source 20 is switched off. In order to be sure that the reset input R is made inactive (low), it is required that the difference control current ICO-ISL is at least larger than the sensed current ISE which is positive.

Now, it is assumed that further the correction current source 70 which supplies the correction current ICR is present in the FIG. 2 topology, in accordance with the present invention. The difference between the control current ICO and the modified control current IMC is equal to the correction current ICR. Again, to be sure that the reset input R is made inactive the modified control current IMC should be positive. An embodiment of the current-mode controlled DC/DC converter in which the modified control current IMC is limited to a minimum value larger than zero is discussed with respect to FIG. 10.

Figure 10:
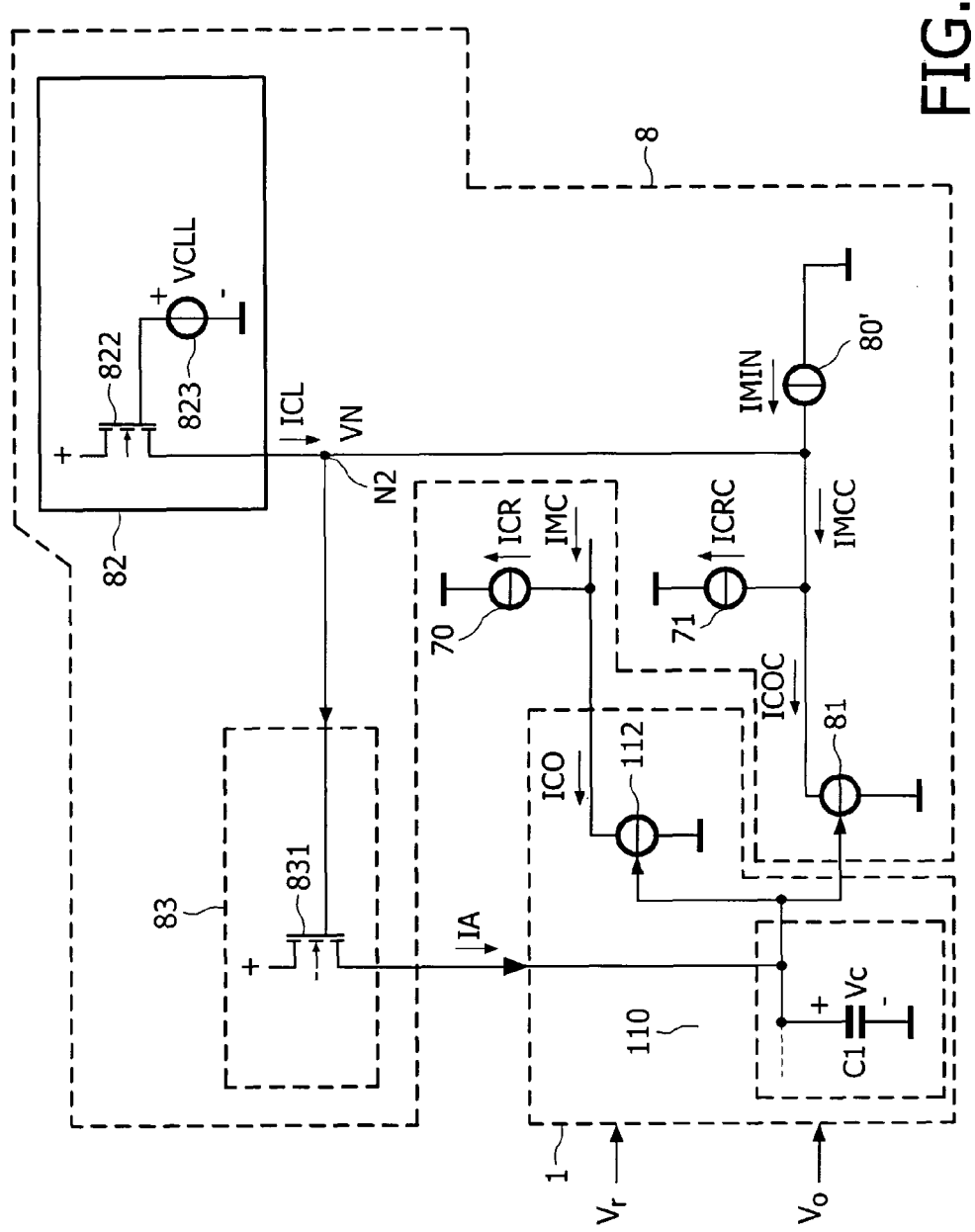
FIG. 10 shows a circuit diagram of an embodiment of the current-mode controlled DC/DC converter in which the modified control signal is limited to a minimum value.

FIG. 10 shows a circuit diagram of an embodiment of the current-mode controlled DC/DC converter in which the modified control signal is limited to a minimum value larger than zero. FIG. 10 is based on FIG. 9, the first difference is that a current source 70 which conducts the correction current ICR has been added at the output of the current source 112, as also is shown in FIG. 2. The sum of the correction current ICR and the control current ICO is the modified control current IMC. The second difference is that a current source 71 has been added at the node N2 to conduct a copy ICRC of the correction current ICR. The sum of the copy correction current ICRC and the copy control current ICOC is the modified copy current IMCC.

The clamping circuit 82 conducts current as long as the modified copy current IMCC as larger than the minimum current IMIN which is larger than zero. The amplifying circuit 83 is inactive and thus does not influence the integration node in the I-controller. When the modified copy current IMCC becomes smaller than the minimum current IMIN supplied by the current source 80', the clamping circuit 82 ceases conduction and the amplifier 83 starts supplying current IA to the capacitor C1 of the I-controller. Consequently, the copy control current ICOC is controlled such that the modified copy current IMCC is limited to the level of the minimum current IMIN.

A consequence of meeting the requirement that the modified copy current IMCC cannot become smaller that the minimum current IMIN is that the average inductor current ILA may become negative. The converter is able to convert the energy stored in the smoothing capacitor C back to the power supply voltage Vb. The converter now more or less operates as a boost converter from the output capacitor C to the battery which supplies the supply voltage Vb. It has to be noted that the current in the switch S1 now may become negative, thus this switch S1 should have bi-directional current capability. Also the switch S2 should have bi-directional current capability and thus should be a synchronous switch and not a diode.

Figure 11:
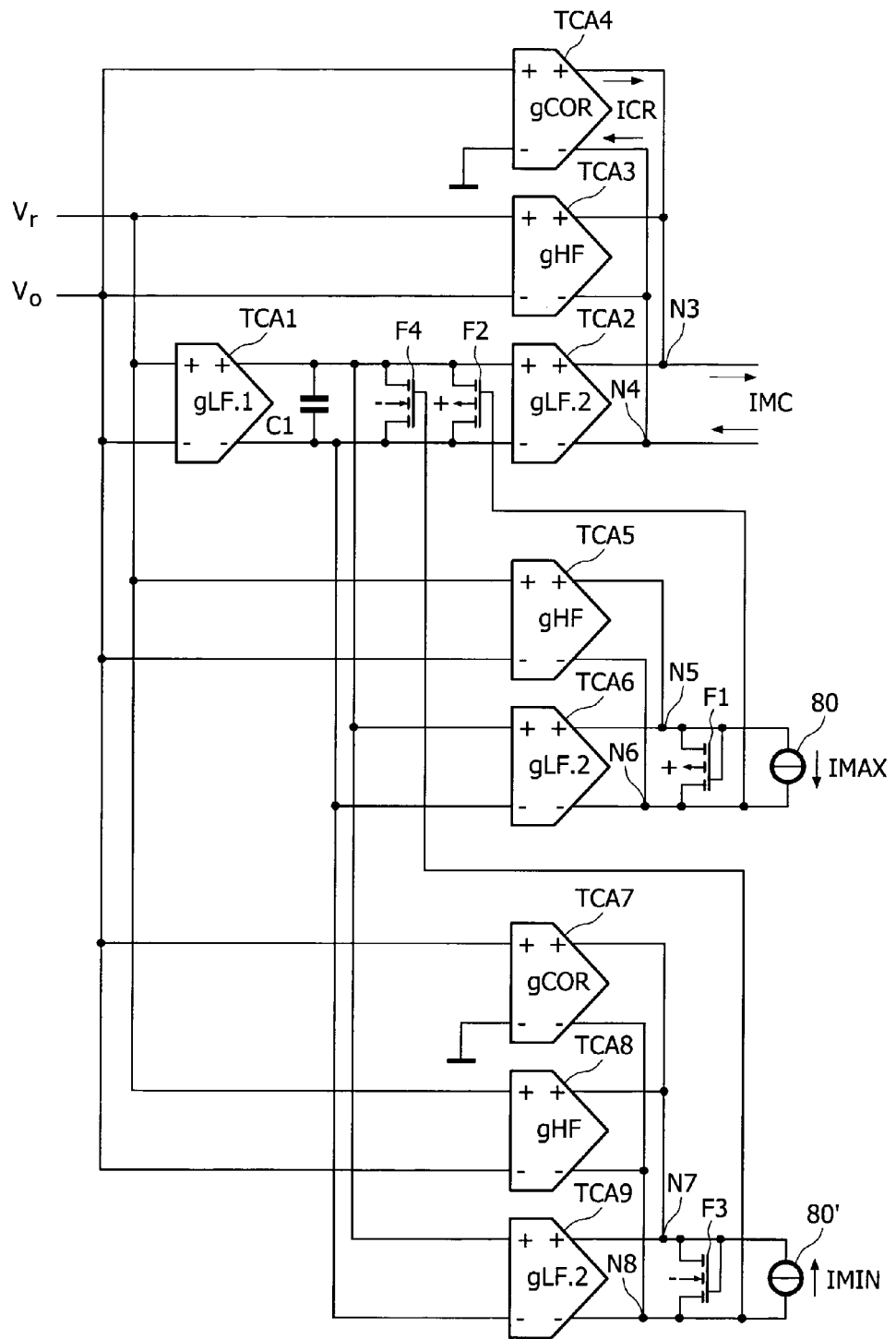
FIG. 11 shows a circuit diagram of an embodiment of the controller and the correction circuit implemented in an integrated circuit

FIG. 11 shows a circuit diagram of an embodiment of the controller and the correction circuit implemented in an integrated circuit. An attractive manner to realize a PI-controller in an integrated circuit is to use fully differential circuitry to profit maximally from common mode rejection to suppress spurious signals which are often present in switched-mode power supplies. The required common-mode control loops which set the common mode voltages of the nodes to appropriate values are not shown.

The transconductance amplifier TCA3 receives the reference voltage at the non-inverting input and the output voltage Vo at the inverting input, and supplies output currents to nodes N3 and N4. The transconductance amplifier TCA3 has a transfer determined by the transconductance gHF which represents the high-frequency proportional part of the PI-controller. The low-frequency integrating part of the PI-controller is generated by the transconductance amplifiers TCA1 and TCA2 and the capacitor C1. The transconductance amplifier TCA1 with transconductance gLF1 receives the reference voltage at the non-inverting input and the output voltage Vo at the inverting input, and supplies output currents to the capacitor C1. The transconductance amplifier TCA2 with transconductance gLF2 receives the voltage across the capacitor C1 between the non-inverting input and the inverting input, and supplies its output currents to the nodes N3 and N4. As far as the components discussed so far are considered, an attractive IC-implementation of the prior art PI-controller is obtained. The sum of the currents at the nodes N3 and N4 form the output currents indicated by IMC. These currents IMC now form the control signal CO of FIG. 1.

This control signal CO of the prior art is changed into the modified control current IMC which corresponds to the modified control current IMC shown in FIG. 2 by adding the transconductance amplifier TCA4 with transconductance gCOR. The transconductance amplifier TCA4 has a non-inverting input which receives the output voltage Vo and an inverting input which is connected to a reference voltage which is ground. The transconductance amplifier TCA4 supplies the correction currents ICR to the nodes N3 and N4.

The limiting circuit 82 which limits the maximum value of the correction signal CO comprises the current source 80 which supplies the maximum current IMAX from the node N5 to the node N6, the transconductance amplifier TCA5 with transconductance gHF, the transconductance amplifier TCA6 with transconductance gLF2, and the FET's F1 and F2. The transconductance amplifier TCA5 receives the reference voltage at the non-inverting input and the output voltage Vo at the inverting input, and supplies output currents to the nodes N5 and N6. The transconductance amplifier TCA6 receives the voltage across the capacitor C1 between the non-inverting input and the inverting input, and supplies its output currents to the nodes N5 and N6 also. Thus, the transconductance amplifier TCA5 supplies the proportional part of the copy control current ICOC of FIG. 7, and the transconductance amplifier TCA6 supplies the integrating part of the copy control current ICOC. The FET F1 which has a main current path arranged between the nodes N5 and N6 and a control electrode connected to the node N5 forms the clamping circuit 82 of FIG. 7. The FET F2 which has a main current path arranged in parallel with the capacitor C1 and a control electrode connected to the node N6 forms the amplifier 83 of FIG. 7.

The limiting circuit which limits the minimum value of the modified currents IMC of FIG. 2 and FIG. 10 comprises: the current source 80' which supplies the minimum current IMIN from the node N8 to the node N7, the transconductance amplifier TCA7 with transconductance gCOR, the transconductance amplifier TCA8 with transconductance gHF, the transconductance amplifier TCA9 with transconductance gLF2, and the FET's F3 and F4. The transconductance amplifier TCA9 receives the voltage across the capacitor C1 between the non-inverting input and the inverting input, and supplies its output currents to the nodes N7 and N8. Thus, the transconductance amplifier TCA8 supplies the proportional part of the copy control current ICOC of FIG. 10, and the transconductance amplifier TCA9 supplies the integrating part of the copy control current ICOC. The transconductance amplifier TCA7 has a non-inverting input which receives the output voltage Vo and an inverting input which is connected to a reference voltage which is ground, and supplies the correction currents ICRC to the nodes N7 and N8. The FET F3 which has a main current path arranged between the nodes N7 and N8 and a control electrode connected to the node N7 forms the clamping circuit 82 of FIG. 10. The FET F4 which has a main current path arranged in parallel with the capacitor C1 and a control electrode connected to the node N8 forms the amplifier 83 of FIG. 10.

FIG. 12 shows a circuit diagram of an embodiment of a current-mode controlled DC/DC buck-boost converter in accordance with the invention. This embodiment is based on the block diagram of the prior art converter shown in FIG. 1 wherein the buck converter comprising the switches S1 and S2 is replaced by an inverting or non-inverting buck-boost converter. FIG. 12 shows a non-inverting buck-boost converter with a possible implementation of the controller in an integrated circuit which uses current sources.

The non-inverting buck-boost converter receives a DC-input voltage Vb and supplies an output voltage Vo. The input voltage Vb may be supplied by a battery, or may be a rectified mains voltage. The output voltage is supplied to a load LO which usually comprises a smoothing capacitor C and an impedance Z which represents the impedance of the circuit(s) which have to be powered. The input voltage source supplies an input current Ib. The current supplied to the load LO is indicated by Io. The buck-boost converter further comprises four controllable switches S10 to S13 and an inductance L. The switch S10 is arranged between the input voltage source Vb and a node NA. The switch S12 is arranged between node NA and ground. The inductor L is arranged between the node NA and a node NB. The switch S11 is arranged between the node NB and ground, and the switch S13 is arranged between the node NB and the load LO. The inductor L may be a coil or a transformer. The switches S10 to S13 are controlled with the control signals SC10 to SC13, respectively.

The operation of the non-inverting buck-boost converter as such is well known in the art, and is therefore only briefly elucidated. If the switches S10 and S11 are closed while the switches S12 and S13 are open, the inductor current IL through the inductor L increases substantially linearly. The current to the load LO is zero. If the switches S12 and S13 are closed while the switches S10 and S11 are open, the decreasing inductor current IL is supplied to the load LO. First, the part of the controller equivalent with the controller shown in FIG. 1 is discussed to which a correction circuit 7 is added which comprises a current source 71 and a multiplier 72. The current-mode controller 1 comprises the subtractor or comparator 10 which receives the reference voltage Vr and the output voltage Vo to supply the error signal ER. The controller 11 may comprise a P, an I, PI, or PID controller 110 which generates the control signal CO from the error signal ER. The control signal CO controls a current source 111 to draw a control current ICO.

The multiplier 72 multiplies the control current ICO with a factor MF to draw the multiplied control current MCO from the node N1. The current source 71 draws the correction current ICR from the node N1. The sum of the currents MCO and ICR is the modified control current IMC. The slope compensation circuit 2 comprises a current source 21 which supplies a slope compensation current ISL to the node N1. The sense circuit 6 supplies a sensed current ISE, which is representative for the inductor current IL, to the node N1.

A voltage at the node N1 is determined by the sum of the currents MCO, ICR, ISE and ISL. The comparator 3 comprises the amplifier 30 which supplies the reset signal RS which indicates when the level of the sensed current ISE becomes equal to the difference of the modified control current IMC and the slope compensation current ISL.

Both the oscillator 5 and the Set-Reset Flip-Flop 4 are identical to the same items shown in FIG. 1. However, now, the Set-Reset Flip-Flop 4 supplies the switch signals SC10, SC11 at its non-inverting output Q and the switch signals SC12, SC13 at its inverting output Qn. The operation of this controller is elucidated in detail with respect to the signals shown in FIG. 13. An alternative embodiment of the correction circuit 7 is discussed with respect to FIG. 14.

Figure 13:
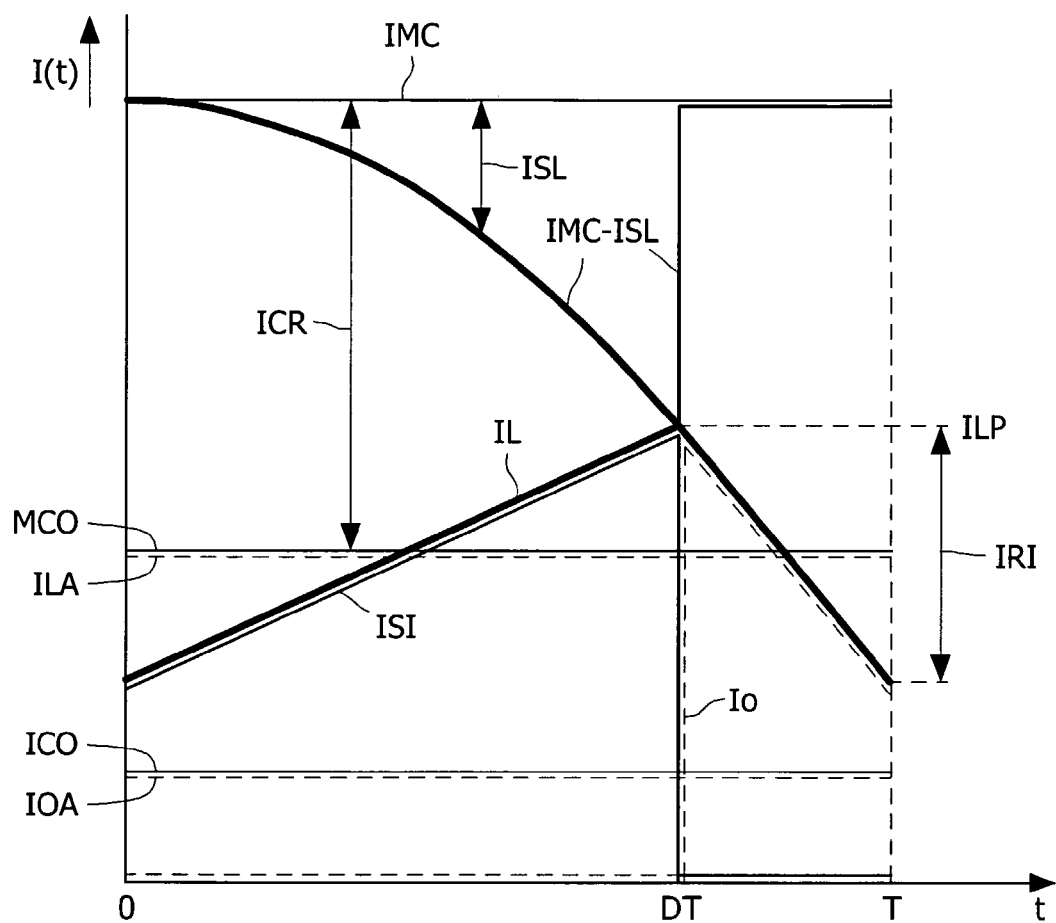
FIG. 13 shows signals elucidating the operation of the buck-boost converter shown in FIG. 12.

FIG. 13 shows signals elucidating the operation of the buck-boost converter shown in FIG. 12. Because, in the same steady state, the same current IS1 flows through the switch S1, the sensed current ISE is identical to that of the prior art converter. Also, the purpose of the slope compensation current ISL is considered to be identical to that of the prior art converter. Again, in the same steady state, the total current at the node N1 should cause a reset of the Set-Reset Flip-Flop at the same instant DT thus the current IMC must be identical to the original control current ICO which was generated when the correction circuit 7 was not present. Consequently, the effect of adding the correction circuit 7 is that the control current ICO must decrease exactly with the value of the correction current ICR, and with the multiplication factor MF. In fact, the current MCO is the original correction current ICO minus the correction current ICR, and the new control current ICO is the current MCO divided by the multiplication factor MF.

Thus, if the correction current ICR is selected to be equal to the sum of the level of the slope compensation current ISL at the switch off instant DT and half the ripple current IRI, the current MCO becomes equal to the average inductor current ILA. Further, if the multiplication factor MF is the ratio between the average inductor current ILA and the average output current IOA, the control current ICO becomes equal to the average output current IOA. Consequently, the gain Ai of the transfer from control current ICO to the average output current IOA becomes equal to 1 and the closed-loop bandwidth of the transfer from reference voltage Vr to output voltage Vo has its maximum value. However, it suffices that the control signal ICO corresponds directly to the average output current IOA. The word "corresponds" is used to indicate that scaled versions of the actual currents may be used.

In the now following, the operation of a buck-boost converter which has such a correction circuit 7 is elucidated. Again, by way of example only, the controller 110 is a PI controller. The Set-Reset Flip-Flop 4 is reset at the instant DT that the sensed current ISE reaches the level of sum-current IMC from which the slope compensation current ISL is subtracted. The sum-current IMC is also referred to as the multiplied modified control signal MMC.

In the now following calculation, the value of the multiplication factor MF and the value of the correction current ICR are determined for a non-inverting buck-boost converter.

From FIG. 13 it follows that the difference between the modified control current IMC and the average inductor current ILA is $$IMC - ILA = ISL(DT) + IRI/2$$

wherein ISL(DT) is the slope compensation current at the instant DT at which the switches S10 and S11 are switched off, and IRI is the peak to peak ripple current of the inductor current IL.

The optimal slope compensation current ISL for a buck-boost converter is $$ISL(t) = \left( \ln\left( \frac{1}{1 - \frac{t}{T}} \right) - \frac{t}{T} \right) \cdot \frac{T}{L} \cdot Vb$$

wherein t/T is the relative position in a clock cycle with duration T, L is the inductance value of the inductor L, and Vb is the DC-input voltage of the converter.

In steady state, at the instant of switching off the switches S10 and S11, the slope compensation current ISL has the value $$ISL(DT) = \left( \ln\left( \frac{1}{1 - D} \right) - D \right) \cdot \frac{T}{L} \cdot Vb$$

wherein D is the steady state value of the duty cycle, which, if neglecting losses, is Vo/(Vo+Vb).

The peak to peak ripple current on the average coil current ILA is for a buck-boost converter $$IRI = D*T*Vb/L$$

With the above equations, the difference between the modified control current IMC and the average inductor current ILA is $$IMC - ILA = ISL(DT) + \frac{IRI}{2} = \left( \ln\left( 1 + \frac{Vo}{Vb} \right) - \frac{1}{2} \frac{\frac{Vo}{Vb}}{1 + \frac{Vo}{Vb}} \right) \cdot \frac{T}{L} \cdot Vb$$

Consequently, if the correction current ICR has this value, the control current ICO becomes equal to the average inductor current ILA. It has to be noted that the correction current ICR is a positive feedback current which is dependent on both the output voltage Vo and the input voltage Vb.

The average output current IOA is less than the average coil current ILA:

$$IOA = (1 - D) \cdot ILA = \frac{1}{1 + \frac{Vo}{Vb}} \cdot ILA$$

The multiplier 72 has the current gain MF which depends on the input voltage Vb and on the output voltage Vo:

$$MF = 1 + \frac{Vo}{Vb}$$

The current source 71 generates the voltage-dependent correction current $$ICR = \left( \ln\left(1 + \frac{Vo}{Vb}\right) - \frac{1}{2} \frac{\frac{Vo}{Vb}}{1 + \frac{Vo}{Vb}} \right) \cdot \frac{T}{L} \cdot Vb$$

which is added to the output current MCO of the multiplier 72. Note that the current ICR is a positive-feedback current, and not a negative-feedback current, as is usual.

The insertion of the multiplier 72 and the positive-feedback current ICR allow the controller to generate a lower control current ICO whereas the set value of the peak current for the current-controlled inner loop still has the same value as before: it is modified from ICO to IMC=MF*ICO+ICR. As can be seen from the equations above, and as is shown in FIG. 13, the transfer Ai from control current ICO to average output current IOA now is unity. Consequently, the −3 dB bandwidth B of the loop has increased to $$f3 \approx gHF/(2\pi C).$$

A further advantage is that the −3 dB bandwidth depends on two well known quantities only.

A similar improvement of the reaction speed is obtained if other converter topologies than a buck-boost converter are used, or when the PI controller has another behavior, or when the slope compensation has a different shape or is not present at all.

FIG. 14 shows a circuit diagram of another embodiment of a current-mode controlled DC/DC buck-boost converter in accordance with the invention. The buck-boost converter shown in FIG. 14 is almost identical to the buck-boost converter shown in FIG. 12. The only difference is that the multiplier 72 is arranged in-between the current sources 71 and 21 instead of in-between the current sources 71 and 111. Thus, now the control current ICO and the correction current ICR are summed at a same node to obtain the modified control current. The multiplier 72 multiplies the current MCO' with a multiplication factor MF to obtain the multiplied modified control current MMC which is equal to the current IMC.

The multiplication factor MF is still the same as discussed with respect to FIG. 12, the correction current ICR has to become ICR':

$$ICR' = \frac{1}{1 + \frac{Vo}{Vb}} \cdot \left( \ln\left(1 + \frac{Vo}{Vb}\right) - \frac{1}{2} \frac{\frac{Vo}{Vb}}{1 + \frac{Vo}{Vb}} \right) \cdot \frac{T}{L} \cdot Vb$$

The resulting set current for the inner control loop now is IMC=MF*(ICO+ICR').

FIG. 15 shows a circuit diagram of a current controlled DC/DC boost converter for use in the circuit diagrams of FIG. 12 or 14 instead of the buck-boost converter. A controller with the same structure as in FIG. 12 or FIG. 14 may be used in conjunction with a boost converter. First, as shown in FIG. 15 it is elucidated what has to be changed to replace the buck-boost converter by a boost converter. Next, it is elucidated how the multiplication factor MF and the correction current ICR have to be selected for a boost converter if the controller has the topology shown in FIG. 12 or FIG. 14, respectively.

Starting from the non-inverting buck-boost converter shown in FIG. 12, the boost converter can be obtained by replacing switch S10 by a short circuit, and by omitting switch S12. The switch S11 is now referred to as switch S20, the switch S13 is now referred to as switch S21. The current sense 6 may now be arranged in series with the switch S20. The controller which generates the switch signals SC10 and SC12 for controlling the switches S20 and S21, respectively, has the same topology as shown either in FIG. 12 or in FIG. 14. The operation of the basic topology of a boost converter as shown in FIG. 15 is well known in the art and is therefore elucidated briefly only. If the switch control signal SC10 closes the switch S20 and the switch control signal SC12 opens the switch S21, the inductor current IL through the inductor L starts increasing. The output current Io is zero. When the inductor current IL reaches the peak level which is set in the controller, the switch S20 opens and the switch S21 closes. Now, a decreasing output current Io flows into the load LO. The switch S20 is closed again and the switch S21 is opened again at the start of a next cycle which is determined by the oscillator or clock generator 5.

The difference between modified control current IMC and average coil current ILA is $$IMC - ILA = ISL(DT) + \frac{IRI}{2}$$

in which ISL(DT) is the slope compensation current at the instant of switching off (t=DT) and IRI is the peak-peak ripple current amplitude of the inductor current IL. For a boost converter the optimal slope-compensating current ISL with non-linear time dependence is $$ISL(t) = \frac{1}{2}\left(\frac{t}{T}\right)^2 \cdot \frac{T}{L} \cdot Vo = \frac{t^2 Vo}{2TL}$$

in which t/T is the relative position in the clock cycle with duration T, L is the inductance value of the inductor L, and Vo is the value of the output voltage of the DC:DC boost converter. At the instant of switching off the control switch S20, the slope compensation current ISL has a value $$ISL(DT) = \frac{1}{2}D^2 \cdot \frac{T}{L} \cdot Vo$$

wherein D is the steady-state value of the duty cycle.

For a boost converter the peak-peak ripple current amplitude IRI on the average inductor current ILA in steady state is $$IRI = \frac{Vb}{L}DT$$

The steady-state value D of the duty cycle in a boost converter, neglecting losses, is $$D = 1 - \frac{Vb}{Vo}$$

The difference between modified control current IMC and average inductor current ILA can now be found by combining the above equations:

$$IMC - ILA = ISL(DT) + \frac{IRI}{2} = \frac{T}{2L} \cdot (Vo - Vb)$$

This difference is linearly proportional to the difference of output voltage Vo and input voltage Vb.

The average output current IOA is less than the average inductor current ILA:

$$IOA = (1 - D) \cdot ILA = \frac{Vb}{Vo} \cdot ILA$$

First with respect to the controller topology shown in FIG. 12, the multiplier 72 has the current gain MF which depends on the input voltage Vb and on output voltage Vo:

$$MF = \frac{Vo}{Vb}$$

and the current source 71 generates the voltage-dependent correction current $$ICR = \frac{T}{2L} \cdot (Vo - Vb)$$

which is added to the output current MCO of the multiplier 72. Note that the current ICR is a positive-feedback current, and not a negative-feedback current, as is usual.

The insertion of the multiplier 72 and the addition of the positive-feedback current ICR allow the controller to generate a lower control current ICO whereas the set value of the peak current for the current-controlled inner loop still has the same value as before: it is modified from ICO to IMC=MF*ICO+ICR. As can be seen from the equations above, and as is shown in FIG. 13, the transfer Ai from control current ICO to average output current IOA now is unity.

As an alternative to the insertion of the positive feedback current ICR to the output current MCO of the multiplier 72, an alternative positive-feedback current ICR' can be added to the input current ICO of the multiplier 72, as is shown in FIG. 14. Thus, now, the control current ICO and the correction current ICR' are summed at the same node to obtain the modified control current MCO'. The multiplier 72 multiplies the current MCO' with a multiplication factor MF to obtain the multiplied modified control current MMC which is equal to the current IMC.

The multiplication factor MF is still the same as discussed with respect to FIG. 12, the correction current ICR has to become ICR':

$$ICR' = \frac{Vb}{Vo} \cdot \frac{T}{2L} \cdot (Vo - Vb)$$

The resulting set current for the inner control loop now is IMC=MF*(ICO+ICR').

The topology of the controller shown in FIG. 12 is slightly more attractive than the topology of the controller shown in FIG. 14, because the required positive feedback current ICR is described by linear equation instead of a non-linear equation.

Considering the stability of the feedback loop, the positive-feedback gain via the correction current ICR or ICR' is weaker than the negative-feedback gain via the PI controller, thus the positive feedback contribution does not jeopardize the control loop stability.

It should be noted that the above-mentioned embodiments illustrate rather than limit the invention, and that those skilled in the art will be able to design many alternative embodiments without departing from the scope of the appended claims.

For example, the current directions all may be inversed. The skilled person easily understands how to adapt the embodiments shown if PMOST FET's are replaced by NMOST FET's and the other way around.

The general idea to convert the control current ICO into a modified control current IMC by adding the positive feedback current ICR is elucidated in the Figures with respect to a buck-converter, a non-inverting buck-boost converter, and a boost converter. The control current ICO has been made equal to the average output current supplied to the parallel arrangement of the smoothing capacitor C and the load RL. This general idea also works in other converter configurations, such as, for example, an inverting buck-boost, or Cuk converter. It has to be noted that the examples shown for the calculation of the correction current ICR and, if relevant, the multiplication factor MF are valid for the particular optimal slope compensation current ISL. However, the slope compensation current ISL may differ from the optimal functions discussed. It will be clear that if the control current ICO should resemble the average output current IOA optimally, the correction current ICR, and if relevant, the multiplication factor have to be determined to fit the slope compensation current ISL. On the other hand, a perfect resemblance between the control current and the average output current is not required to obtain an improvement in the reaction speed over the prior art.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A current-mode controlled DC/DC converter configured to receive an input voltage to supply an output voltage, the current-mode controlled DC/DC converter comprises:
   an inductor and a controllable switch being coupled to the inductor configured to obtain a periodically varying inductor current through the inductor;
   a current-mode controller configured to compare the output voltage with a reference voltage to obtain an error signal, the current-mode controller further being configured to apply a transfer function on the error signal to obtain a control signal;
   a correction circuit configured to add to the control signal a correction signal being representative-of a difference between an original level of the control signal and an average value of the inductor current to obtain a modified control signal; and
   a drive circuit configured to compare a sensed signal being representative of the inductor current with the modified control signal to switch off the controllable switch when a level of the sensed signal reaches a level of the modified control signal.

2. A current-mode controlled DC/DC converter as claimed in claim 1, wherein the correction circuit is configured to add the correction signal being representative of a difference between the average value and an extreme value of the inductor current.

3. A current-mode controlled DC/DC converter as claimed in claim 1, being a buck converter and comprising the correction circuit configured to generate the correction signal being $(Vo*T)/2L$ wherein L is an inductance of the inductor.

4. A current-mode controlled DC/DC converter as claimed in claim 1 configured to supply the output voltage and an output current to a load, wherein the correction circuit further comprises a multiplier configured to multiply the control signal with a multiplication factor to obtain a multiplied control signal, the multiplication factor being representative of a ratio between an average value of the inductor current and an average value of the output-current, and wherein the correction circuit is configured to add the correction signal to the multiplied control signal.

5. A current-mode controlled DC/DC converter as claimed in claim 4, being a buck-boost converter, the multiplication factor, being 1+Vo/Vb, wherein Vb is the input voltage, and Vo is the output voltage.

6. A current-mode controlled DC/DC converter as claimed in claim 5, wherein the correction circuit is configured to generate the correction signal being $$(\ln(1+k)-0.5*k/1+k))*T*Vb/L$$

wherein k=Vo/Vb, T is a duration of one period of the periodically varying inductor current, and L is an inductance of the inductor.

7. A current-mode controlled DC/DC converter as claimed in claim 4, being a boost converter, the multiplication factor being Vo/Vb, wherein Vb is the input voltage, and Vo is the output voltage.

8. A current-mode controlled DC/DC converter as claimed in claim 7, wherein the correction circuit is configured to generate the correction signal being $(Vo-Vb)*T/2L$ wherein Vo is the output voltage, T is a duration of one period of the periodically varying inductor current, and L is an inductance of the inductor.

9. A current-mode controlled DC/DC converter as claimed in claim 1 configured to supply the output voltage an output current to load, wherein the correction circuit further comprises a multiplier configured to multiply the modified control signal with a multiplication factor being representative of a ratio between an average value of the inductor current and an average value of the output current to obtain a multiplied modified control signal, and wherein the drive circuit is configured to compare a sensed signal being representative for the inductor current with the multiplied modified control signal to switch off the controllable switch when a level of the sensed signal reaches a level of the multiplied modified control signal.

10. A current-mode controlled DC/DC converter as claimed in claim 9, being a buck-boost converter, the multiplication factor being 1+Vo/Vb, wherein Vb is the input voltage, and Vo is the output voltage.

11. A current-mode controlled DC/DC converter as claimed in claim 10, wherein the correction circuit is configured to generate the correction signal being $$(1/1+k))*(\ln(1+k)-0.5*k(1+k)*T*Vb/L$$

wherein k=Vo/Vb, T is a duration of one period of the periodically varying inductor current, and L is an inductance of the inductor.

12. A current-mode controlled DC/DC converter as claimed in claim 9, being a boost converter, the multiplication factor being Vo/Vb, wherein Vb is the input voltage, and Vo is the output voltage.

13. A current-mode controlled DC/DC converter as claimed in claim 12, wherein the correction circuit is configured to generate the correction signal being $$(Vb/Vo)*(Vo-Vb)*T/2L,$$

wherein Vo is the output voltage, T is a duration of one period of the periodically varying inductor current and L is an inductance of the inductor.

14. A current-mode controlled DC/DC converter as claimed in claim 1, further comprising a slope compensation circuit configured to introduce a slope compensation signal, the correction circuit configured to generate the correction signal being representative of a sum of said difference and a level of said slope compensation signal at a switch-off instant at which the drive circuit is configured to switch off the controllable switch.

15. A current-mode controlled DC/DC converter as claimed in claim 1, further comprising a limiting circuit configured to limit a minimum and/or maximum value of the control signal.

16. A current-mode controlled DC/DC converter as claimed in claim 1, wherein
   the current-mode controller comprises a controlled current source configured to supply to a node a control current being determined by the control signal,
   the correction circuit comprises a current source configured to supply the correction signal as a correction current to the node,
   a sense circuit configured to sense the inductor current and to supply the sensed signal being a sensed current to the node, a polarity of the control current and the correction current equal and opposite to a polarity of the sensed current, and
   the drive circuit is coupled to the node configured to determine when a level of the sensed current reaches a level of the sum of the control current and the correction current.

17. A current-mode controlled DC/DC converter as claimed in claim 16, further comprising a slope compensation circuit comprising a current source configured to supply a slope compensation current to the node, a polarity of the slope compensation current being equal to the polarity of the sensed current, the current source of the correction circuit configured to supply the correction current being a sum of a current representative for said difference and said level of the slope compensation current at a switch-off instant at which the drive circuit is configured to switch off the controllable switch.

18. A current-mode controlled DC/DC converter as claimed in claim 17, wherein the current-mode controller comprises a comparator configured to compare the reference voltage and the output voltage to obtain the error signal, and a PI controller configured to receive the error voltage to supply the control signal, and wherein the correction circuit is configured to supply the correction current.

19. A current-mode controlled DC/DC converter as claimed in claim 16, wherein the current-mode controller comprises an I-controller with an input-configured to influence an integrating action of the I-controller, and wherein the current-mode controlled DC/DC converter further comprises:
- a first additional current source configured to supply a first current proportional to the control current to a further node,
- a second additional current source configured to supply a predetermined fixed second current to the further node, wherein a voltage at the further node is dependent on a difference between the first current and said second current,
- a clamping circuit configured to limit the voltage at the further node, and
- an amplifier having an input connected to the further node and an output connected to the input of the I-controller.

20. A current-mode controlled DC/DC converter as claimed in claim 19, wherein the second current indicates a maximum current level, and wherein the amplifier is configured to decrease the integrating action when the first current reaches a maximum current level.

21. A current-mode controlled DC/DC converter as claimed in claim 19, wherein the second current indicates a minimum current level, and wherein the amplifier is configured to increase the integrating action when the first current drops below the minimum current level.

22. A current-mode controlled DC/DC converter as claimed in claim 21, wherein the current-mode controlled DC/DC converter further comprises a third additional current source configured to supply a third current proportional to the correction current to the further-node, and wherein the amplifier is configured to increase the integrating action when the first current drops below the sum of the minimum current level of the third current.

23. A current-mode controlled DC/DC converter as claimed in claim 19, wherein the I-controller comprises an integrating capacitor, and wherein the output of the amplifier is connected to the integrating capacitor.

24. An apparatus as claimed in claim 1 being a mobile apparatus comprising a battery configured to supply a battery voltage, the current-mode controlled DC/DC converter configured to convert the battery voltage into the power supply voltage.

25. A method of controlling a current-mode controlled DC/DC converter comprising a controllable switch being coupled to an inductor and configured to receive an input voltage to supply an output voltage, the method comprises:
- generating a periodically varying inductor current through the inductor;
- comparing the output voltage with a reference voltage to obtain an error signal, and applying transfer function on the error signal to obtain a control signal;
- adding to the control signal a correction signal being representative of a difference between an original level of the control signal and an average value of the inductor current to obtain a modified control signal; and
- comparing a sensed signal being representative for the inductor current with the modified control signal to switch off the controllable switch when a level of the sensed signal reaches a level of the modified control signal.

26. An apparatus comprising the current-mode controlled DC/DC converter as claimed in claim 1 and signal processing circuits configured to receive a power supply voltage generated by the current-mode controlled DC/DC converter.

* * * * *